(12) United States Patent
Ledet

(10) Patent No.: US 10,957,200 B1
(45) Date of Patent: *Mar. 23, 2021

(54) TRANSPORT PARKING SPACE AVAILABILITY DETECTION

(71) Applicant: OPEN INVENTION NETWORK LLC, Durham, NC (US)

(72) Inventor: David Gerard Ledet, Allen, TX (US)

(73) Assignee: OPEN INVENTION NETWORK LLC, Durham, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/378,434

(22) Filed: Apr. 8, 2019

Related U.S. Application Data

(63) Continuation of application No. 15/589,469, filed on May 8, 2017, now Pat. No. 10,255,809.

(51) Int. Cl.
| | |
|---|---|
| *G08G 1/14* | (2006.01) |
| *G08G 1/0962* | (2006.01) |
| *H04L 29/08* | (2006.01) |
| *G06K 9/00* | (2006.01) |

(52) U.S. Cl.
CPC .......... *G08G 1/144* (2013.01); *G08G 1/0962* (2013.01); *G08G 1/146* (2013.01); *G08G 1/147* (2013.01); *H04L 67/306* (2013.01); *G06K 9/00812* (2013.01)

(58) Field of Classification Search
None
See application file for complete search history.

(56) References Cited

U.S. PATENT DOCUMENTS

| | | |
|---|---|---|
| 2005/0083212 A1 | 4/2005 | Chew |
| 2006/0111835 A1 | 5/2006 | Baker et al. |
| 2011/0320256 A1 | 12/2011 | Florucci et al. |
| 2012/0285790 A1 | 11/2012 | Jones et al. |
| 2014/0266802 A1* | 9/2014 | Love ................ G08G 1/144 340/932.2 |
| 2014/0285361 A1* | 9/2014 | Tippelhofer ........ G08G 1/143 340/932.2 |
| 2015/0086071 A1 | 3/2015 | Wu et al. |
| 2016/0104328 A1 | 4/2016 | Chen et al. |
| 2016/0259984 A1* | 9/2016 | Zhang ............... G06K 9/00825 |

* cited by examiner

*Primary Examiner* — Thomas S McCormack

(57) ABSTRACT

Identifying parking spaces and notifying user devices provides an easy way to reduce traffic and save time for registered users. One example may include activating a sensor to detect at least one status change, monitoring a predefined area for the at least one status change, receiving at least one status change at a first time, receiving at least one additional status change at a second time, comparing the at least one status change and the at least one additional status change to a valid sequence of status changes, determining a valid sequence of status changes has occurred, and transmitting a notification to a registered user device previously registered to receive a notification when the valid sequence of status changes occurs.

20 Claims, 18 Drawing Sheets

TRANSPORT PARKING SPACE AVAILABILITY DETECTION

TECHNICAL FIELD OF THE APPLICATION

This application relates to a mobile application for transport parking and more particularly to identifying an available parking space for the transport using location determination and cameras.

BACKGROUND OF THE APPLICATION

There are approximately one quarter of a billion cars currently registered in the United States. The majority of these vehicles spend the majority of their time in a resting state. This resting state requires a parking spot to rest in when not in use. In large cities the number of available parking spots may be limited with respect to the number of cars wishing to park at that moment. In some large cities individual parking spots have sold for nearly a million dollars, which tends to indicate the potential value of finding a parking spot.

In publicly available parking environments, there are two general types, parking garages or open lots and individual parking spots on the street. The curb-side parking spots may be timed, metered or restricted. The availability of these curb-side parking spots may be limited and being aware of their location and availability may prove an optimal service. The instant disclosure will concentrate on the availability of public parking spaces and the alerting of available parking spaces and their subsequent filling.

SUMMARY OF THE APPLICATION

One example embodiment may provide a method that includes at least one of monitoring a predefined area via at least one sensor, detecting at least one change via the sensor, comparing the at least one change to a predefined condition stored in memory, determining the at least one change satisfies the predefined condition, and determining a changed parking space status.

Another example embodiment may include an apparatus that includes a processor configured to monitor a predefined area via at least one sensor, detect at least one change via the sensor, compare the at least one change to a predefined condition stored in memory, determine the at least one change satisfies the predefined condition, and determine a changed parking space status.

Still another example embodiment may include a non-transitory computer readable storage medium configured to store instructions that when executed causes a processor to perform at least one of monitoring a predefined area via at least one sensor, detecting at least one change via the sensor, comparing the at least one change to a predefined condition stored in memory, determining the at least one change satisfies the predefined condition, and determining a changed parking space status.

Still yet another example embodiment may include a method that includes activating a sensor to detect at least one status change, monitoring a predefined area for the at least one status change, receiving at least one status change at a first time, receiving at least one additional status change at a second time, comparing the at least one status change and the at least one additional status change to a valid sequence of status changes, determining a valid sequence of status changes has occurred, and transmitting a notification to a registered user device previously registered to receive a notification when the valid sequence of status changes occurs.

Yet a further example embodiment may include an apparatus that includes a processor configured to activate a sensor to detect at least one status change, monitor a predefined area for the at least one status change, a receiver configured to receive at least one status change at a first time, receive at least one additional status change at a second time, and the processor is further configured to compare the at least one status change and the at least one additional status change to a valid sequence of status changes, and determine a valid sequence of status changes has occurred, and a transmitter configured to transmit a notification to a registered user device previously registered to receive a notification when the valid sequence of status changes occurs.

Still yet another example embodiment may include a non-transitory computer readable storage medium configured to store instructions that when executed causes a processor to perform activating a sensor to detect at least one status change, monitoring a predefined area for the at least one status change, receiving at least one status change at a first time, receiving at least one additional status change at a second time, comparing the at least one status change and the at least one additional status change to a valid sequence of status changes, determining a valid sequence of status changes has occurred, and transmitting a notification to a registered user device previously registered to receive a notification when the valid sequence of status changes occurs.

DETAILED DESCRIPTION OF THE APPLICATION

It will be readily understood that the components of the present application, as generally described and illustrated in the figures herein, may be arranged and designed in a wide variety of different configurations. Thus, the following detailed description of the embodiments of a method, apparatus, and system, as represented in the attached figures, is not intended to limit the scope of the application as claimed, but is merely representative of selected embodiments of the application.

The features, structures, or characteristics of the application described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment of the present application. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" has been used in the description of embodiments of the present application, the application may be applied to many types of network data, such as, packet, frame, datagram, etc. For purposes of this application, the term "message" also includes packet, frame, datagram, and any equivalents thereof. Furthermore, while certain types of messages and signaling are depicted in exemplary embodiments of the application, the application is not limited to a certain type of message, and the application is not limited to a certain type of signaling. Example embodiments provide ways for determining when a parking spot is available, alerting a user of the available parking spot, alerting other users that the parking spot is not available and determining when the parking spot is available again to repeat the cycle.

Figure 1:
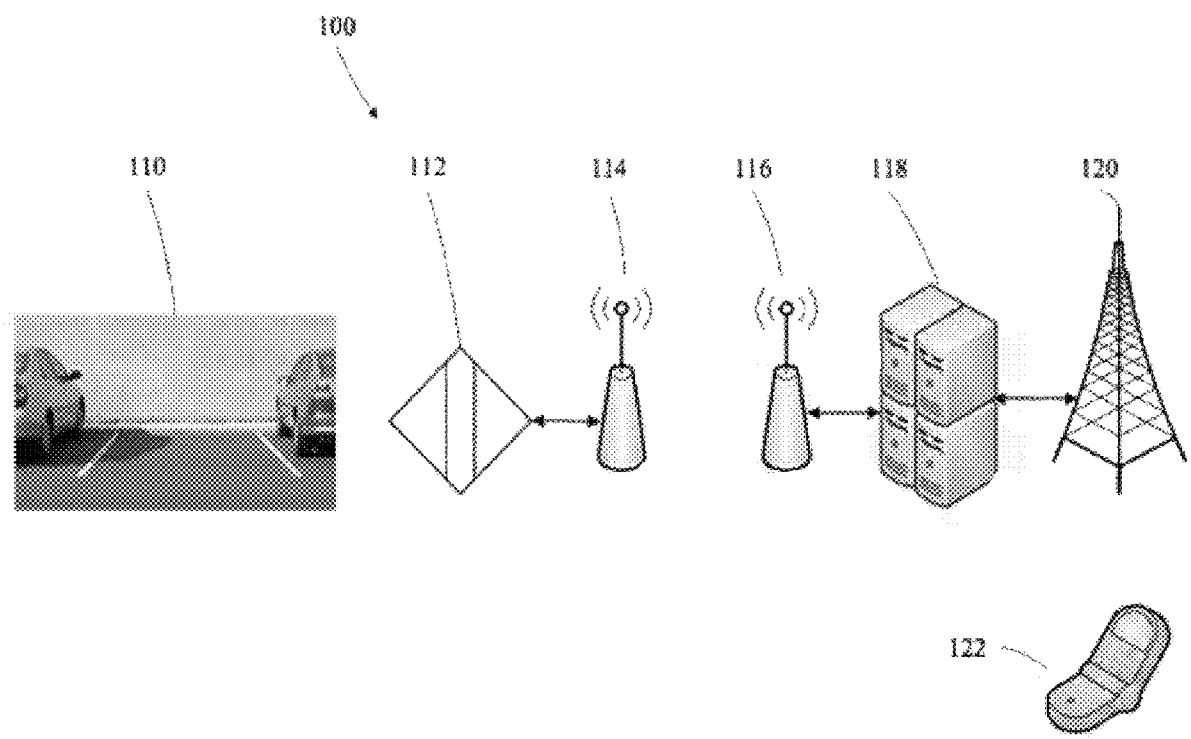
FIG. 1 illustrates a network diagram of a client device operating with a park assistance configuration according to example embodiments.

FIG. 1 illustrates a park view system 100 which includes various components including a sensor 112 that senses the presence or absence of a car in a parking spot 110, a first communication device 114 that transmits the results of the sensor detection to a receiving unit 116 that is connected to a local logic computing unit 118 that assesses the results of the detection unit and provides the information to subscribed user devices, and a transceiver 120 that transmits the results to mobile units 122 that expressed interest in the result. An interested user profile is a profile associated with a user device that has been registered to receive information on the status of parking spaces.

The sensor 112 in the overall system design can be an electromagnetic sensor to sense a tire pressure RF signal, an engine RF signal, a microphone measuring the incoming tire sound, engine sound and/or door sounds, transmission sounds, etc. The sensor may also be a camera, a metal detector, a proximity detector, (IR) infrared signal detector, etc. In each case, a local logic unit will do initial processing to determine whether a parking event has occurred.

Figure 2:
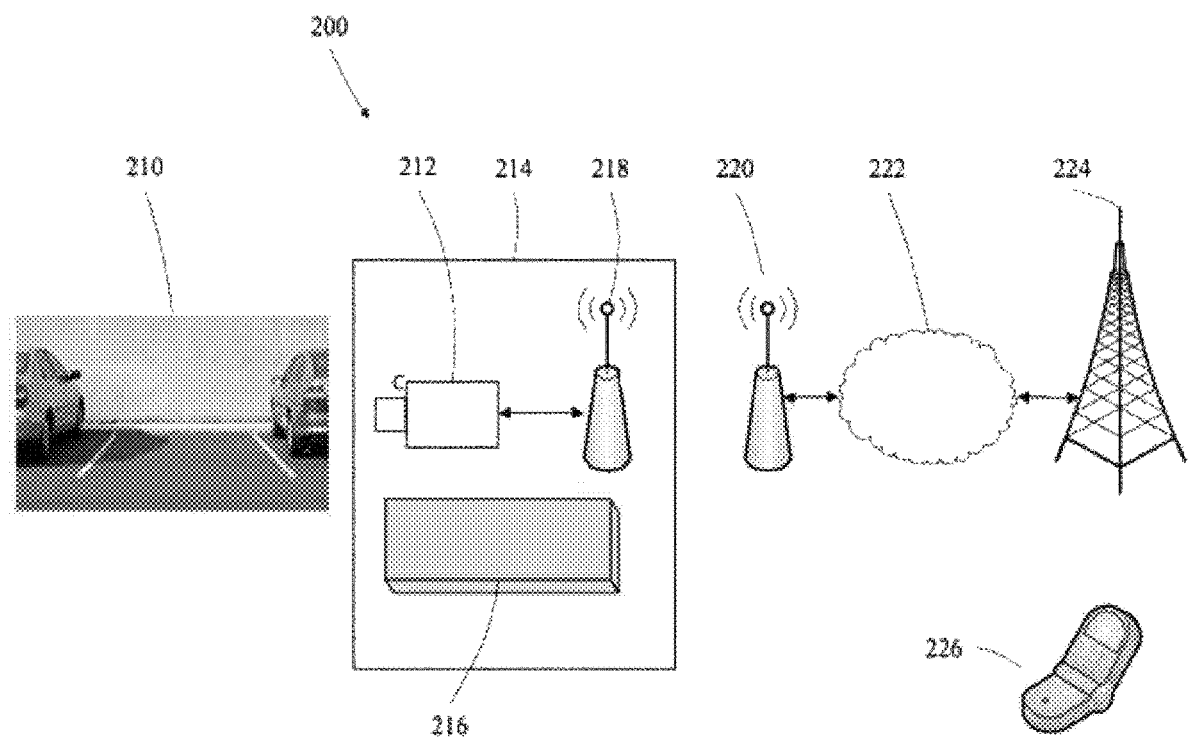
FIG. 2 illustrates a network diagram of a client device operating with a park assistance configuration having a curbside camera according to example embodiments.

FIG. 2 illustrates an example curbside camera configuration 200 according to example embodiments. Referring to FIG. 2, in this example, the camera 212 is mounted near a parking lot to record activity at a parking spot(s) 210. The camera is mounted on a parking meter 214 or other parking spot accessory, such as a common vehicle movement prevention cement block, and may utilize a solar panel 216 to recharge the unit. In this example the camera 210 has a transmitting communication device 218 mounted with the camera to transmit a wireless communication signal to a receiver 220. The receiving communication device 220 uploads changes in status to a remote logical unit 222, which in this instance is a cloud representing certain network computers, which send the status changes to interested parties by a cellular transceiver 224 to a user's device 226, which may be a personal computer, a laptop, a personal computing tablet, a smartphone, a PDA, a watch, glasses or any device with a processor and memory. The camera 212 will send a photo or other data wirelessly according to the MPEG-2, H.263, H.264, and/or MPEG-4 AVC (Advanced Video Coding) standards, or other known digital information standards.

An interested user profile or user device represents a user that is registered to receive information on the status of parking spaces as provided by a server and application setup to maintain the parking space information. The camera in this instance may be connected to a remote logic unit, which performs a low-level pattern recognition function to determine the presence or absence of a vehicle. The data associated with the pattern recognition function may also be stored either locally on the curbside device or remotely at a server or distributed site. The camera 212 performs a low-level pattern recognition function to determine the presence or absence of a vehicle. An example low level pattern recognition in JAVA is provided below as an example:

```
 1 /*
 2  * Part of the Java Image Processing Cookbook, please see
 3  *
 4  * for information on usage and distribution.
 5  * Rafael Santos (rafael.santos@lac.inpe.br)
 6  */
 7 package tutorials.simpleclassifier;
 8
 9 import java.awt.Color;
10 import java.awt.image.BufferedImage;
11 import java.io.BufferedReader;
12 import java.io.File;
13 import java.io.FileReader;
```

```
14 import java.io.IOException;
15 import java.util.StringTokenizer;
16 import java.util.TreeMap;
18 import javax.imageio.ImageIO;
20 /**
21 * This application classifies images using the parallel-
epiped classifier.
22 * Please see
23 * http://www.lac.inpe.br/~rafael.santos/JIPCookbook.jsp
24 * for more information on the files and formats used in
this class.
25 */
26 public class ClassifyWithParallelepipedAlgorithm
27 {
28 /**
29 * The application entry point. We must pass three
parameters: the original
30 * image file name, the name of the file with the descrip-
tion of the classes,
31 * and the name of the file with the signatures for the
classes.
32 * @throws IOException
33 */
34 public static void main(String[ ] args) throws IOExcep-
tion
35 {
36 // Check parameters names.
37 if (args.length !=3)
38 {
39 System.err.println("Must pass three command-line
parameters to this application:");
40 System.err.println("—The original image (from which
samples will be extracted;");
41 System.err.println("—The file with the classes names and
colors");
42 System.err.println("—The file with the signatures for
each class");
43 System.exit(1);
44 }
45 // Open the original image.
46 BufferedImage input=ImageIO.read(new File(args[0]));
47 // Read the classes description file.
48 BufferedReader br=new BufferedReader(new FileReader
(args[1]));
49 // Store the classes color in a map.
50     TreeMap<Integer,Color>classMap=new
TreeMap<Integer, Color>( );
51 while(true)
52 {
53 String line=br.readLine( );
54 if (line==null) break;
55 if (line.startsWith("#")) continue;
56 StringTokenizer st=new StringTokenizer(line);
57 if (st.countTokens( )<4) continue;
58 int classId=Integer.parseInt(st.nextToken( ));
59 int r=Integer.parseInt(st.nextToken( ));
60 int g=Integer.parseInt(st.nextToken( ));
61 int b=Integer.parseInt(st.nextToken( ));
62 classMap.put(classId,new Color(r,g,b));
63 }
64 br.close( );
65 // Read the signatures from a file.
66 TreeMap<Integer,int[ ]>minMap=new TreeMap<Integer,
int[ ]>( );
67       TreeMap<Integer,int[       ]>maxMap=new
TreeMap<Integer, int[ ]>( );
68 br=new BufferedReader(new FileReader(args[2]));
69 while(true)
70 {
71 String line=br.readLine( );
72 if (line==null) break;
73 if (line.startsWith("#")) continue;
74 StringTokenizer st=new StringTokenizer(line);
75 if (st.countTokens( )<7) continue;
76 int classId=Integer.parseInt(st.nextToken( ));
77 int[ ] min=new int[3]; int[ ] max=new int[3];
78 min[0]=Integer.parseInt(st.nextToken( ));
79 min[1]=Integer.parseInt(st.nextToken( ));
80 min[2]=Integer.parseInt(st.nextToken( ));
81 max[0]=Integer.parseInt(st.nextToken( ));
82 max[1]=Integer.parseInt(st.nextToken( ));
83 max[2]=Integer.parseInt(st.nextToken( ));
84 minMap.put(classId,min);
85 maxMap.put(classId,max);
86 }
87 br.close( );
88 // Create a color image to hold the results of the
classification.
89 int w=input.getWidth( ) int h=input.getHeight( );
90 BufferedImage results=new BufferedImage(w,h,Buff-
eredImage.TYPE_INT_RGB);
91 // Do the classification, pixel by pixel, selecting which
class they should be assigned to.
92 for(int row=0;row<h;row++)
93 for(int col=0;col<w;col++)
94 {
95 int rgb=input.getRGB(col,row);
96 int r=(int)((rgb&0x00FF0000)>>>16); // Red level
97 int g=(int)((rgb&0x0000FF00)>>>8); // Green level
98 int b=(int) (rgb&0x000000FF); // Blue level
99 // To which class should we assign this pixel?
100 Color assignedClass=new Color(0,0,0); // unassigned.
101 for(int key:minMap.keySet( ))
102 {
103    if    (isBetween(r,g,b,minMap.get(key),maxMap.get
(key)))
104 {
105 assignedClass=classMap.get(key);
106 }
107 }
108 // With the color, paint the output image.
109 results.setRGB(col,row,assignedClass.getRGB( ));
110 }
111 // At the end, store the resulting image.
112   ImageIO.write(results,"PNG",new   File("classified-
with-parallelepiped.png"));
113 }
114
115 private static boolean isBetween(int r,int g,int b,int[ ]
min,int[ ] max)
116 {
117 return ((min[0]<=r) && (r<=max[0]) &&
118 (min[1]<=g) && (g<=max[1]) &&
119 (min[2]<=b) && (b<=max[2]));
120 }
121 }.
```

Figure 3:
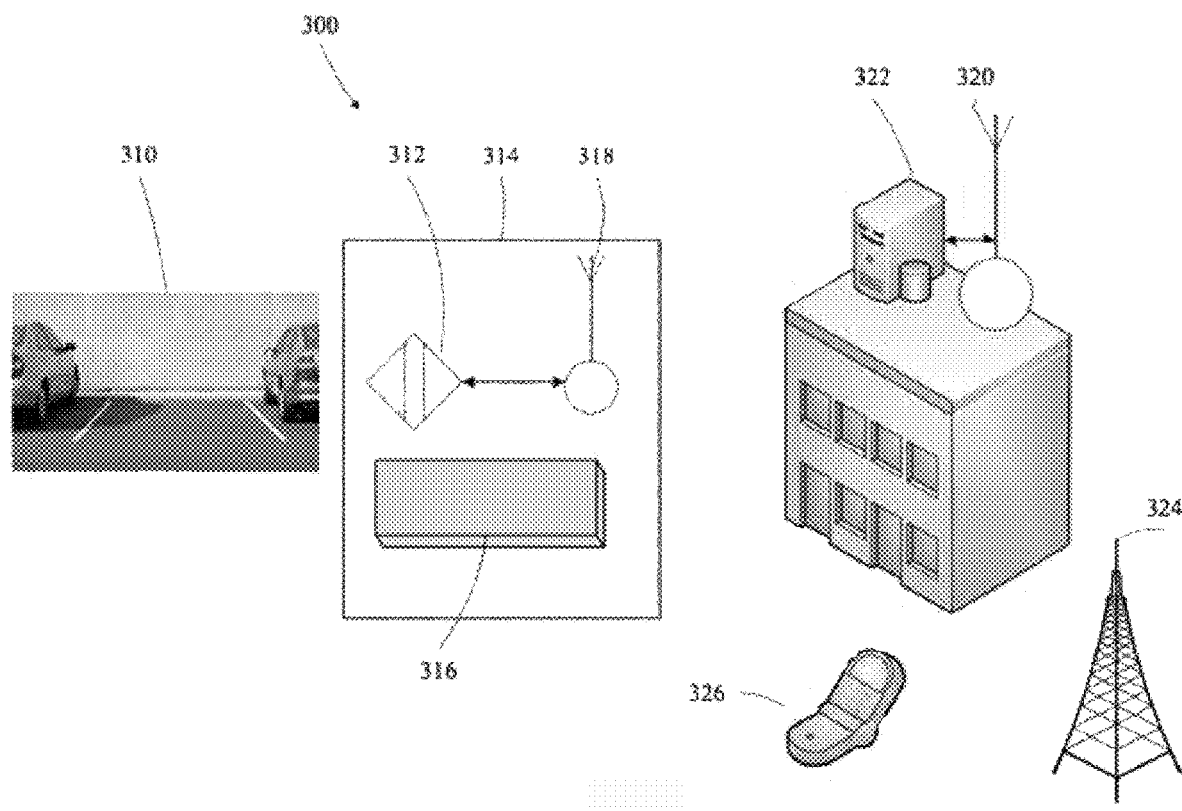
FIG. 3 illustrates a network diagram of a client device operating with a park assistance configuration having a curbside proximity sensor according to example embodiments.

FIG. 3 illustrates a curbside proximity sensor example system according to example embodiments. Referring to FIG. 3 the curbside unit 300 has a ranging device 312 which views a parking spot 310. In this example, the ranging device 312 may be an infrared proximity sensor, a sonar, a radar, etc. In each case, a timer function may be utilized to prevent a non-vehicle object, such as a person walking by from causing a false positive reading. A predetermined timeframe of detection (e.g., 2 seconds, 5 seconds, etc.) may be used to mitigate these types of false readings. Also, a predetermined time may be input by the user, such as 5 minutes of free parking space, or 1 minute if immediate feedback is required.

Additionally, in another example, a set of average free times for the parking space can be calculated at the curbside logic unit and a signal may be sent to a registered user when the parking space has been available for some percentage of the average free time, such as 10% or 50%. In this case, if the parking spot is typically open for one hour, a signal could be sent at 6 minutes and 30 minutes. In this approach, the user may be able to gauge whether he wants to try to access the spot or go to another spot to avoid a failure to secure the spot. In this example, the ranging device 312 wirelessly communicates with a transmitting communication device 318. The curbside unit can be located in a parking meter 314 or other device housing which may have a solar cell 316 to recharge the batteries for the unit used to power the sensor, the transmitter, receiver, logic unit, etc. A receiving communication device 320 may be a receiver at a computer center that receives the local signals and converts them to a computer storage format for database updating and other functions. The uploads and other changes in status can be forwarded to a remote logic unit or computing device 322, in this example, the remote logic unit is a server 322 mounted with the communications device 320 that sends the status changes to interested parties by way of a WiFi transceiver. An interested user may be a user that has been registered to receive information on the status of parking spaces. The WiFi transceiver communicates with a cell tower 324 that subsequently communicates with a cell phone 326. The signals could easily be sent by a wired connection. In this example, the remote logic unit may be replaced with a local logic unit in the curbside unit, additionally, the wireless communication may also communicate directly with a cellular tower. In this approach, the entire system may be self-contained.

Figure 4:
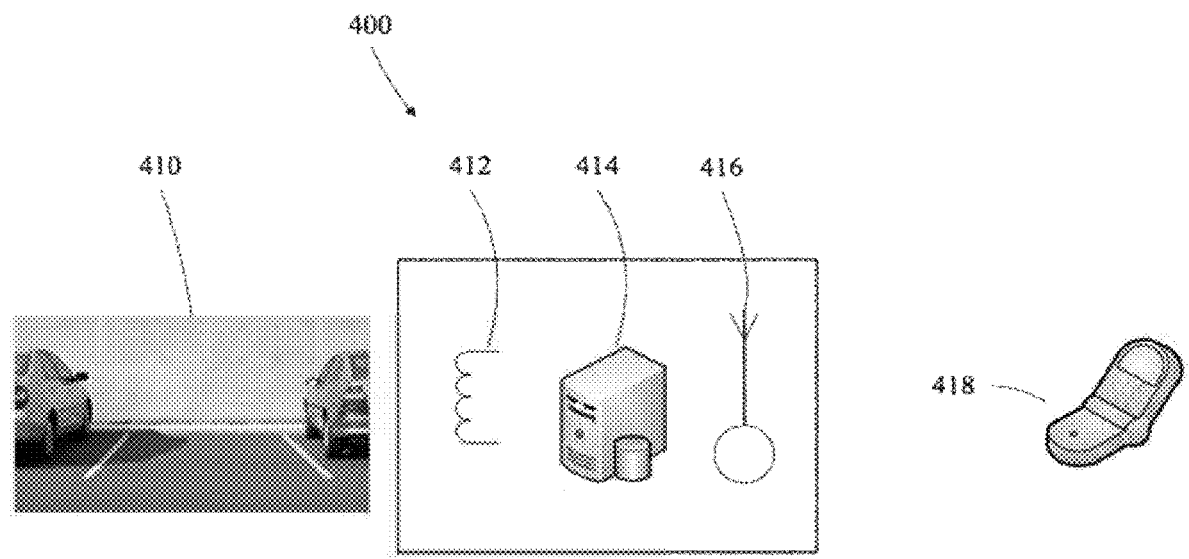
FIG. 4 illustrates a network diagram of a client device operating with a park assistance configuration having a curbside metal detector according to example embodiments.

FIG. 4 depicts another curbside unit 400 having a metal detector 412 adjacent to a parking spot 410. In this example, the metal detector 412 has a wired channel to a local logic unit 414 and is connected to a communication device 416 located in the parking mounted box, which may be a parking meter or may be part of any other section or component associated with a parking space. In this example, the metal detector detects the presence or absence of a vehicle for a time greater than a threshold time, which is maintained by the local logic unit. The change in presence or absence of a vehicle triggers an event in which the communications device 418 alerts users via any messaging format, such as short message service (SMS). An alert signal is sent to the user registered as being interested in a parking spot in the area-of-interest that was input in the registration profile.

Figure 5:
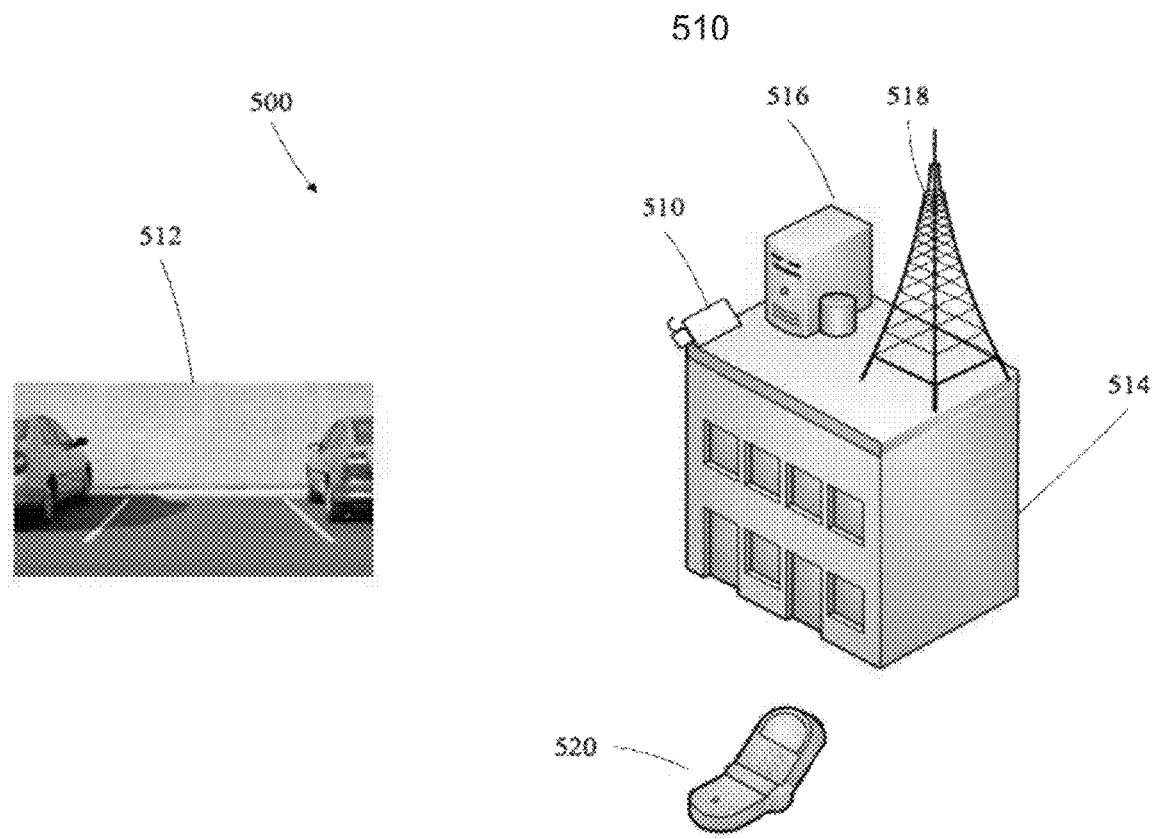
FIG. 5 illustrates a network diagram of a client device operating with a park assistance configuration having a building mounted camera according to example embodiments.

FIG. 5 depicts a configuration 500 with a camera 510 mounted at the top of a building overlooking parking spaces 512. In this example, the camera 510 is mounted to an adjacent building 514 and utilizes local power sources. The camera 510 performs a low-level pattern recognition function to determine the presence or absence of a vehicle.

An example low level pattern recognition in java may be used, which may include:

```
1 /*
2 package tutorials.simpleclassifier;
3 import java.awt.Color;
4 import java.awt.image.BufferedImage;
5 import java.io.BufferedReader;
6 import java.io.File;
7 import java.io.FileReader;
8 import java.io.IOException;
9 import java.util.StringTokenizer;
10 import java.util.TreeMap;
11 import javax.imageio.ImageIO;
12 /**
13 * This application classifies images using the parallelepiped classifier.
14 */
15 public class ClassifyWithParallelepipedAlgorithm
16 {
17 /**
18 * The application entry point. We must pass three parameters: the original
19 * image file name, the name of the file with the description of the classes,
20 * and the name of the file with the signatures for the classes.
21 * @throws IOException
22 */
23 public static void main(String[ ] args) throws IOException
24 {
25 // Check parameters names.
26 if (args.length !=3)
27 {
28   System.err.println("Must pass three command-line parameters to this application:");
29 System.err.println("—The original image (from which samples will be extracted;");
30 System.err.println("—The file with the classes names and colors");
31 System.err.println("—The file with the signatures for each class");
32 System.exit(1);
33 }
34 // Open the original image.
35 BufferedImage input=ImageIO.read(new File(args[0]));
36 // Read the classes description file.
37 BufferedReader br=new BufferedReader(new FileReader(args[1]));
38 // Store the classes color in a map.
39           TreeMap<Integer,Color>classMap=new TreeMap<Integer, Color>( );
40 while(true)
41 {
42 String line=br.readLine( );
43 if (line==null) break;
44 if (line.startsWith("#")) continue;
45 StringTokenizer st=new StringTokenizer(line);
46 if (st.countTokens( )<4) continue;
47 int classId=Integer.parseInt(st.nextToken( ));
48 int r=Integer.parseInt(st.nextToken( ));
49 int g=Integer.parseInt(st.nextToken( ));
50 int b=Integer.parseInt(st.nextToken( ));
51 classMap.put(classId,new Color(r,g,b));
52 }
53 br.close( );
54 // Read the signatures from a file.
55 TreeMap<Integer,int[ ]>minMap=new TreeMap<Integer, int[ ]>( );
56           TreeMap<Integer,int[          ]>maxMap=new TreeMap<Integer, int[ ]>( );
57 br=new BufferedReader(new FileReader(args[2]));
58 while(true)
59 {
60 String line=br.readLine( );
```

```
61 if (line==null) break;
62 if (line.startsWith("#")) continue;
63 StringTokenizer st=new StringTokenizer(line);
64 if (st.countTokens( )<7) continue;
65 int classId=Integer.parseInt(st.nextToken( ));
66 int[ ] min=new int[3]; int[ ] max=new int[3];
67 min[0]=Integer.parseInt(st.nextToken( ));
68 min[1]=Integer.parseInt(st.nextToken( ));
69 min[2]=Integer.parseInt(st.nextToken( ));
70 max[0]=Integer.parseInt(st.nextToken( ));
71 max[1]=Integer.parseInt(st.nextToken( ));
72 max[2]=Integer.parseInt(st.nextToken( ));
73 minMap.put(classId,min);
74 maxMap.put(classId,max);
75 }
76 br.close( );
77 // Create a color image to hold the results of the classification.
78 int w=input.getWidth( ) int h=input.getHeight( );
79 BufferedImage results=new BufferedImage(w,h,BufferedImage.TYPE_INT_RGB);
80 // Do the classification, pixel by pixel, selecting which class they should be assigned to.
81 for(int row=0;row<h;row++)
82 for(int col=0;col<w;col++)
83 {
84 int rgb=input.getRGB(col,row);
85 int r=(int)((rgb&0x00FF0000)>>>16); // Red level
86 int g=(int)((rgb&0x0000FF00)>>>8); // Green level
87 int b=(int) (rgb&0x000000FF); // Blue level
88 // To which class should we assign this pixel?
89 Color assignedClass=new Color(0,0,0); // unassigned.
90 for(int key:minMap.keySet( )
91 {
92 if (isBetween(r,g,b,minMap.get(key),maxMap.get(key)))
93 {
94 assignedClass=classMap.get(key);
95 }
96 }
97 // With the color, paint the output image.
98 results.setRGB(col,row,assignedClass.getRGB( ));
99 }
100 // At the end, store the resulting image.
101 ImageIO.write(results,"PNG",new File("classified-with-parallelepiped.png"));
102 }
103
104 private static boolean isBetween(int r,int g,int b,int[ ] min,int[ ] max)
105 {
106 return ((min[0]<=r) && (r<=max[0]) &&
107 (min[1]<=g) && (g<=max[1]) &&
108 (min[2]<=b) && (b<=max[2]));
109 }
110 }
```

In this example, the camera 510 has a remote logic unit 516 wired to the camera and a cellular transceiver 518 wired to the logic unit. The remote logic unit in this example is a computer. The cellular transceiver 518 communicates with a mobile user device 520, in this instance, a smartphone to indicate where available parking spots are located and those which have been filled. The camera detects the presence or absence of a vehicle for a time greater than a threshold time (i.e., 5 seconds, 10 seconds, etc.), which is determined by the local logic unit. The absence of a vehicle and the transition from occupied to empty and vice versa are noted by the computer and alerts are sent to user devices indicating the absence of a vehicle and/or the change in condition of the parking space.

In each of these cases the detection unit may have a connection to the logic unit by either a direct wiring connection or wireless connection. If the connection is wireless then a local transmitter is required to communicate with the logic unit. The logic unit utilizes a transceiver interface to communicate with user devices. The transceiver interface may be a cellular transceiver, a WiFi transceiver or a similar type of transceiver.

Figure 6:
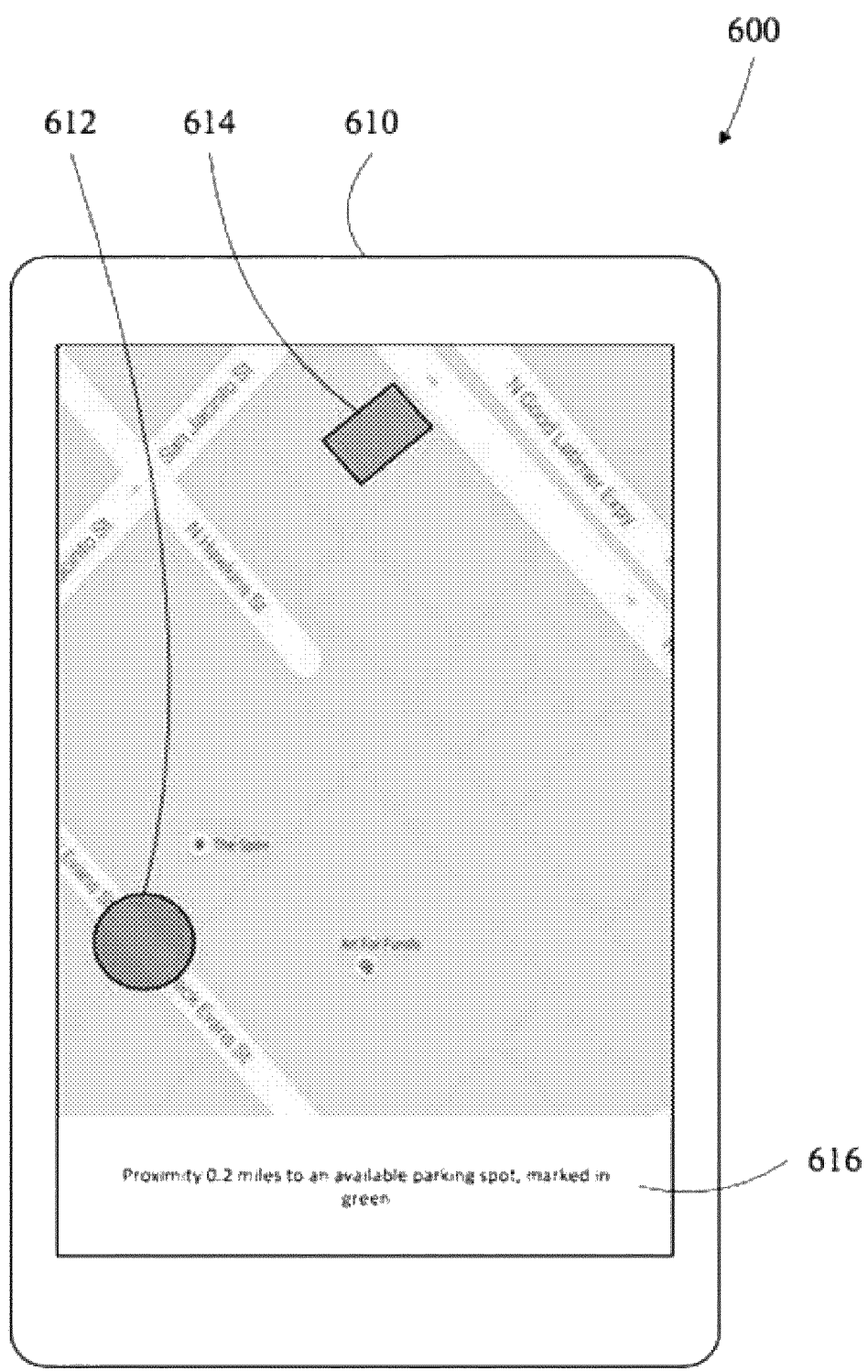
FIG. 6 illustrates a graphical user interface of a parking route configuration according to example embodiments.

FIG. 6 illustrates a user interface display screen of the user's device. In this example 600, the user's device 610 includes a GPS, which indicates the location 612 of the user device and the location of a proximal parking spot 614. The user device also receives instructions 616 on the mobile device using a GOOGLE MAPS API with regard to how far the available parking spot is located from the user device.

The current application may operate either completely or partially on the user's device 610, which may be a mobile device, but may also reside on a user's desktop computer, a personal digital assistant (PDA), tablet computer, or any other device containing a processor, memory, and functional software such as an operating system. In addition, the application may reside either completely or partially on any one of the other elements in the system depicted in FIG. 1, for example, the system, the database and/or the network. If the application of the current application may reside on a device, the application of the current application may be downloaded through a platform, such as an application store or market residing on the device or accessed via the device, or may be accessed through the device's browser communicably coupled to the network. Further, the current application may be pre-loaded on the device or automatically loaded based on the location of the device, attributes of the user and/or of the device. The current application may operate with any device such as a personal computer, a laptop, a personal computing tablet, a smartphone, a PDA, a watch, glasses or any device with a processor and memory.

Figure 7:
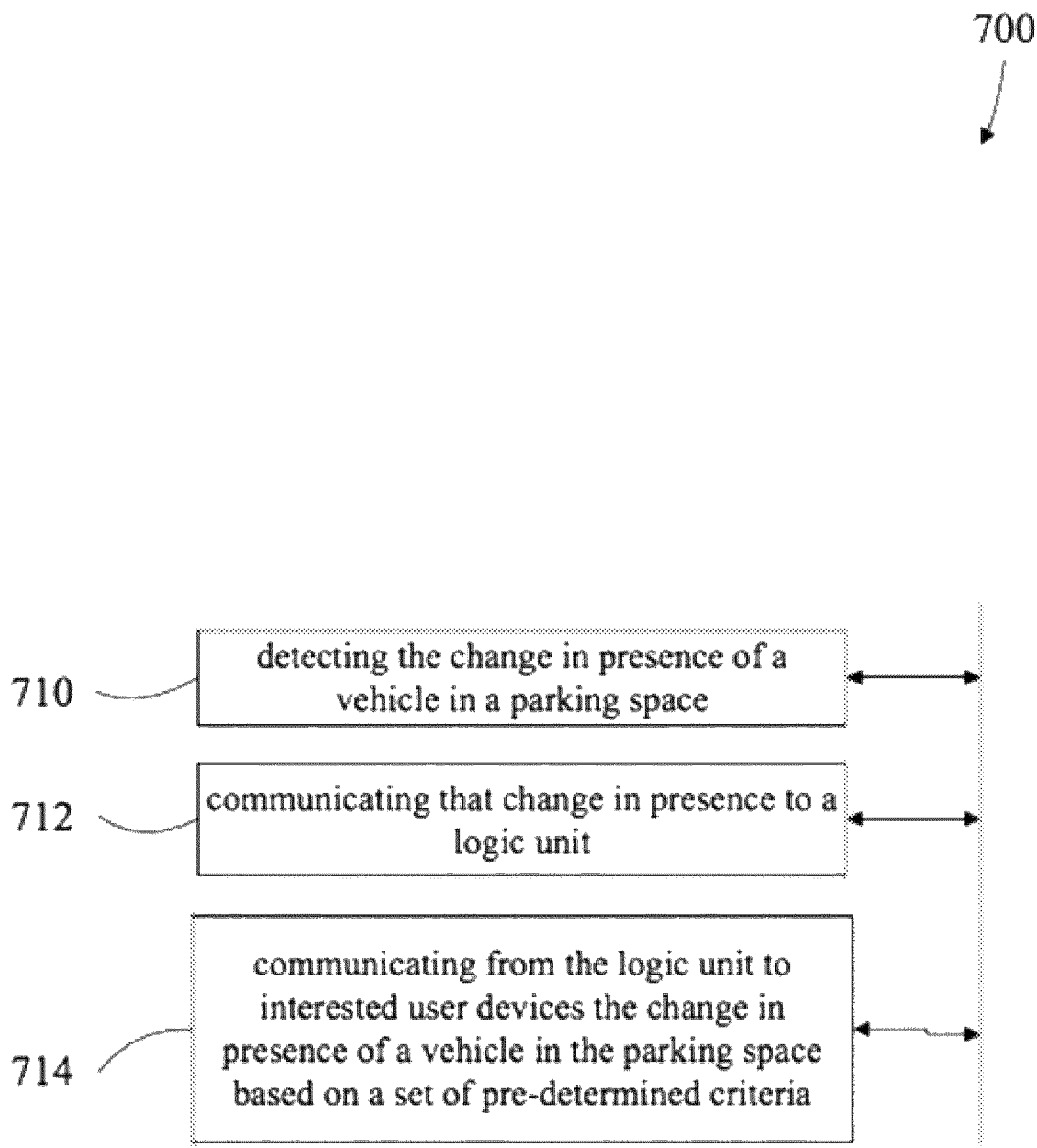
FIG. 7 illustrates a flow diagram example method of operation according to example embodiments.

In FIG. 7, an example method 700 is illustrating for updating availability of parking spaces, the method includes detecting 710 the change in presence of a vehicle in a parking space, such as a vehicle was present in the spot and is not present any longer as determined after a predetermined period of time or the opposite where the spot was available and no vehicle was present and then a vehicle recently arrived as compared to the detection measures prior to the vehicle arriving. The method also include communicating 712 the identified change in presence to a logic unit, the options may include a positive affirmation of availability, a likely availability, a likely unavailability and a positive affirmation of unavailability, each of which may be signaled by any form of digital signaling and logic bit data. The method may also include communicating 714 from the logic unit to interested user devices the change in presence of a vehicle in the parking space based on a set of predetermined criteria. An interested user device may be a device, which has been registered to receive parking space data and is identified in a database by a profile setup to receive such information.

An example signal flow for the device may have the detection device transmit a status signal and detect changes in status. This change of status is detected and sent to a first short-range transceiver. The first short-range transceiver communicates with a second short-range transceiver. The second short-range transceiver is connected to a logic unit. The logic unit keeps track of available parking spaces and users who have either indicated interest in a specific area. The data for both the parking spaces and the locations/proximities of interest are stored at the logic unit. The logic unit uses both the parking lot data and matches it to the user data and sends messages indicating availability or loss of availability of parking spots. The user devices may become candidates to receive such information as they navigate into a nearby area. For example, a user who is registered to receive parking information may only receive updates when the user device passes into the GPS range of the parking spot as identified by a cross-reference location database. For example, if the mobile device has entered an address range on a virtual map as determined via GPS then the parking spaces in that vicinity may be presented to the mobile device automatically as a map overlay or via other efficient approaches to assisting the driver with visualizing the available parking spaces.

Figure 8:
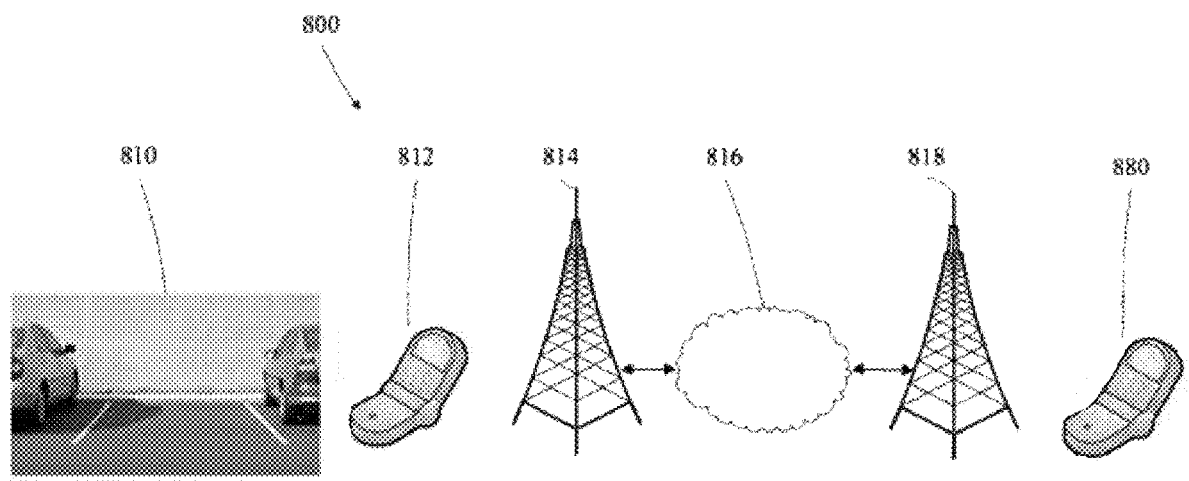
FIG. 8 illustrates a network diagram of a client device operating with a park assistance configuration by using an electromagnetic signal according to example embodiments.

FIG. 8 illustrates an example electromagnetic signal system example according to example embodiments. Referring to FIG. 8, an electromagnetic signal system example 800 may be used for updating availability of parking spaces. In the general electromagnetic signal example, an electrical signal of some type is measured to determine the presence of a vehicle. The electromagnetic signal may take the form of a GPS transponder signal, a tire pressure transducer signal, an engine electromagnetic signal and a cell phone signal analysis.

Referring to FIG. 8, an electromagnetic signal system example 800 may be used for updating availability of parking spaces. This electromagnetic signal is detected by multiple EM detectors and sent to a first short-range transceiver. The first short-range transceiver communicates with a second short-range transceiver. The second short-range transceiver is connected to a logic unit. The logic unit keeps track of available parking spaces 810 and users who have either indicated interest in a specific area. The data for both the parking spaces and the locations/proximities of interest are stored at the logic unit. The logic unit uses both the parking lot data and matches it to the user data and sends messages from device 812 indicating availability or loss of availability of parking spots to other devices 880 via a network 814/816/818. The user devices may become candidates to receive such information as they navigate into a nearby area. In one example, an electronic ignition utilizes an angular sensor to indicate when a spark plug is to be fired, the sensor output is used to trigger a switching device to switch a large current through the coil to a spark plug. The RF energy of the spark plug provides the electromagnetic signal. In the general electromagnetic signal example, an electrical signal of some type is measured to determine the presence of a vehicle. The electromagnetic signal may take the form of a GPS transponder signal, a tire pressure transducer signal, an engine electromagnetic signal, a cell phone signal analysis and the like. The electromagnetic signal is triangulated using additional EM sensors working in tandem and sends the triangulated signal to the second short-range transceiver.

Figure 9:
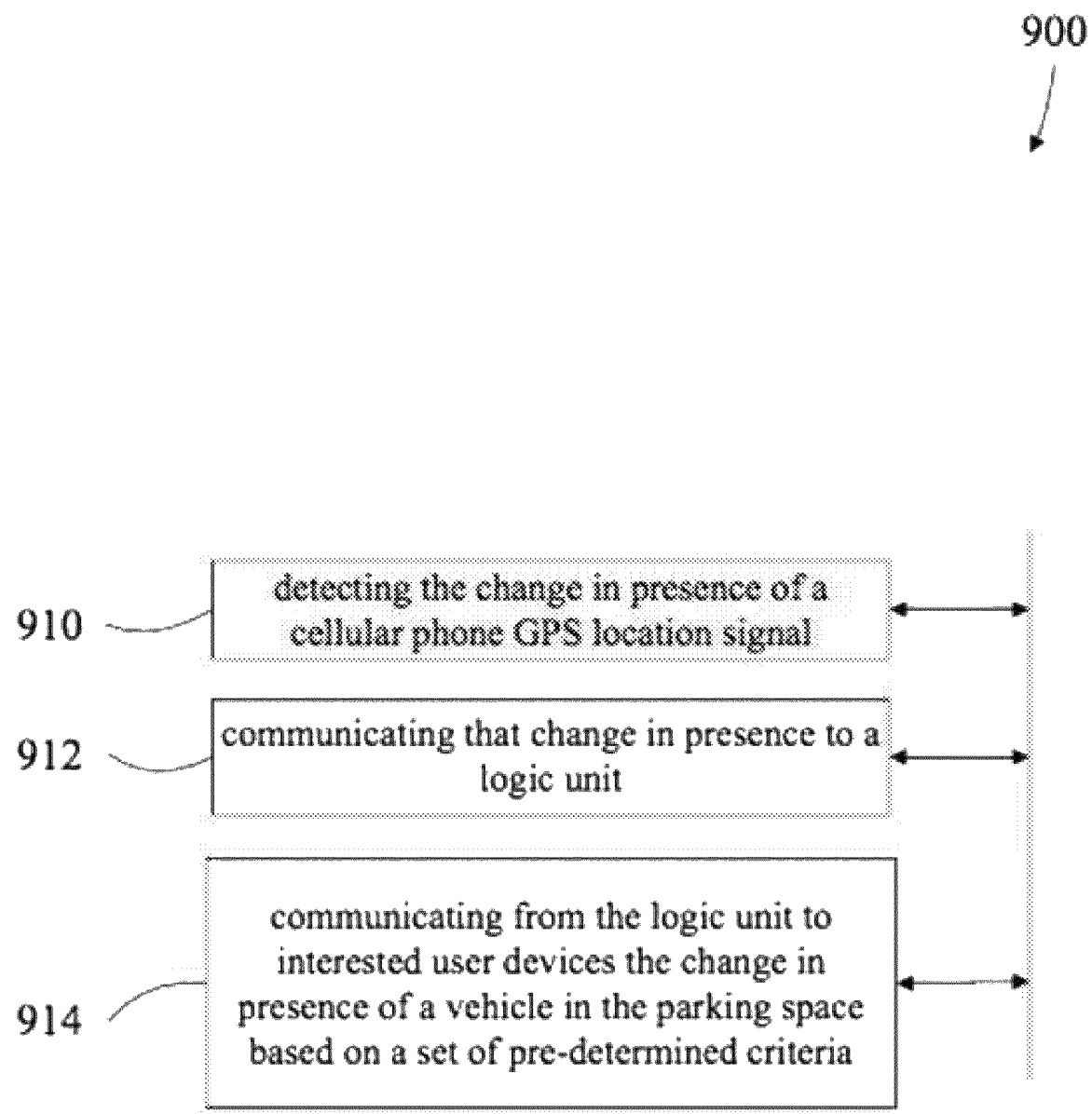
FIG. 9 illustrates a flow diagram of a GPS location signal method for identifying a parking space according to example embodiments.

FIG. 9 illustrates a GPS location signal method according to example embodiments. Referring to FIG. 9, the availability of a parking space via a GPS location example method 900 includes detecting 910 the change in presence of a cellular phone GPS transponder location signal in a parking space, communicating 912 that change in presence to a logic unit. A cellular signal is communicated 914 from the logic unit to a subscribed user device such as a cell phone or smartphone.

An example cellular signal may be communicated using Google Maps Geolocation:
{
"homeMobileCountryCode": 310,
"homeMobileNetworkCode": 260,
"radioType": "gsm",
"carrier": "T-Mobile",
"cellTowers": [
{
"cellId": 39627456,
"locationAreaCode": 40495,
"mobileCountryCode": 310,
"mobileNetworkCode": 260,
"age": 0,
"signalStrength": −95
}
],
"wifiAccessPoints": [
{
"macAddress": "01:23:45:67:89:AB",
"signalStrength": 8,
"age": 0,
"signalToNoiseRatio": −65,
"channel": 8
},
{
"macAddress": "01:23:45:67:89:AC",
"signalStrength": 4,
"age": 0
}.

The communication of this data to an interested user is based on parking spaces in an area-of-interest marked-out by the interested user. An interested user is a user that has been registered to receive information on the status of parking spaces.

Figure 10:
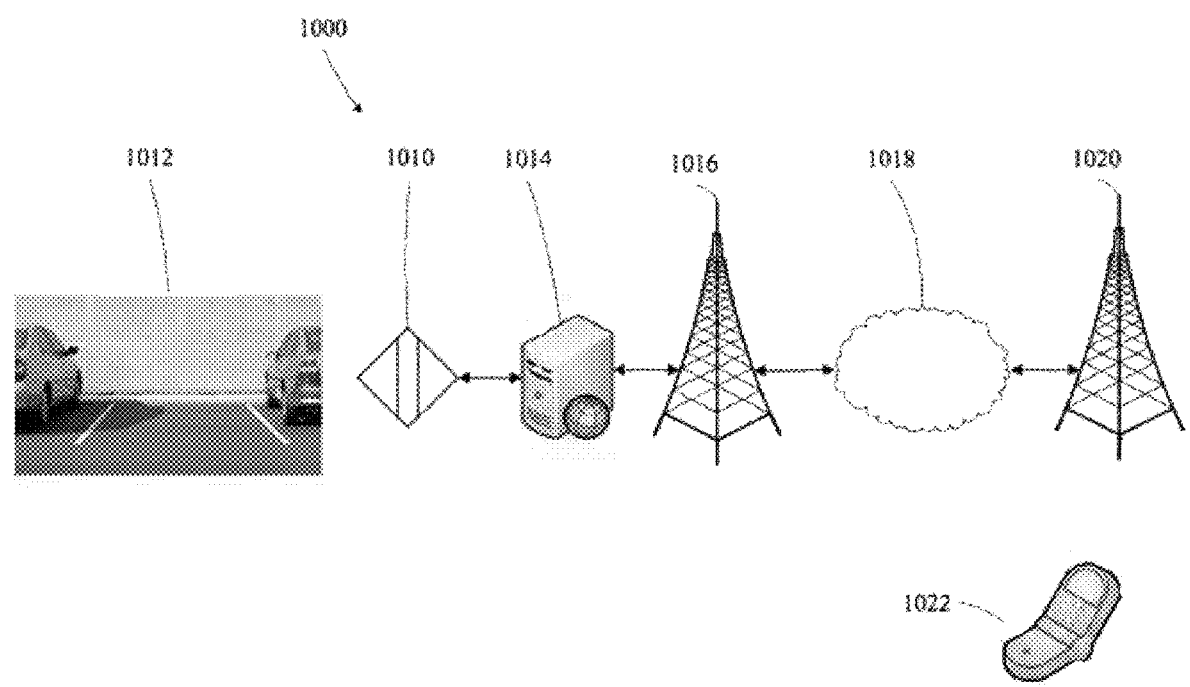
FIG. 10 illustrates a network diagram of a client device operating with a tire pressure transponder according to example embodiments.

FIG. 10 illustrates a tire pressure transponder sensor configuration according to example embodiments. In FIG. 10, the available parking spaces may be identified based on a tire pressure transponder location example 1000. In the year 2000, the USA mandated the transportation recall enhancement, accountability and documentation act (TREAD). One example includes a transmitter which includes a tire identification signal that is 32 bits in length and is transmitted at 315 Mhz or 434 Mhz. These identification IDs are unique and provide measurement information. The system may include detecting 1010 the change in presence of a tire pressure transponder signal in a parking space 1012. This change in presence of the tire pressure transponders may be detected by the presence or absence of the tracked identification IDs. Therefore, the detection of a specific tire pressure ID and its subsequent loss would indicate the approach and departure of the car associated with the identification ID. This identification ID signal is tracked as it approaches and leaves the parking space. A local processing unit 1014 then analyzes the identification signal received at the RF receiver 1010. The local processing unit 1014 is linked to a cellular transceiver 1016 and network 1018. The identification ID ingress/egress is communicated as a change in presence to the local processing unit that contains a computer processor and memory. A cellular signal is communicated from the local processing unit to a cloud source for processing. An example parking space tire pressure transponder JAVA API that sends an SMS text message over a cellular system may include,

```
<modelVersion>4.0.0</modelVersion>
<groupId>tire.pressure</groupId>
<artifactId>tire-pressure</artifactId>
<packaging>jar</packaging>
<version>1.0</version>
<name>tire-pressure</name>
<url>http://maven.apache.org</url>
<dependencies>
    <dependency>
       <groupId>junit</groupId>
       <artifactId>junit</artifactId>
       <version>4.11</version>
          <scope>test</scope>
       </dependency>
     </dependencies>
   </project>
import urllib
def sendSMS(uname, pword, numbers, sender, message):
    params = {'uname':uname, 'pword':pword, 'selectednums':numbers,
'message':message, 'from':sender}
   return (f.read( ), f.code).
```

The local processor reviews the analysis and determines whether a parking space tire pressure transponder is indicated, which determines the availability of a parking space, which is sent by cellular communication 1020 to an interested user device such as a cell phone 1022. The communication of this data to an interested user is based on parking spaces in an area of interest marked out by the interested user.

Figure 11:
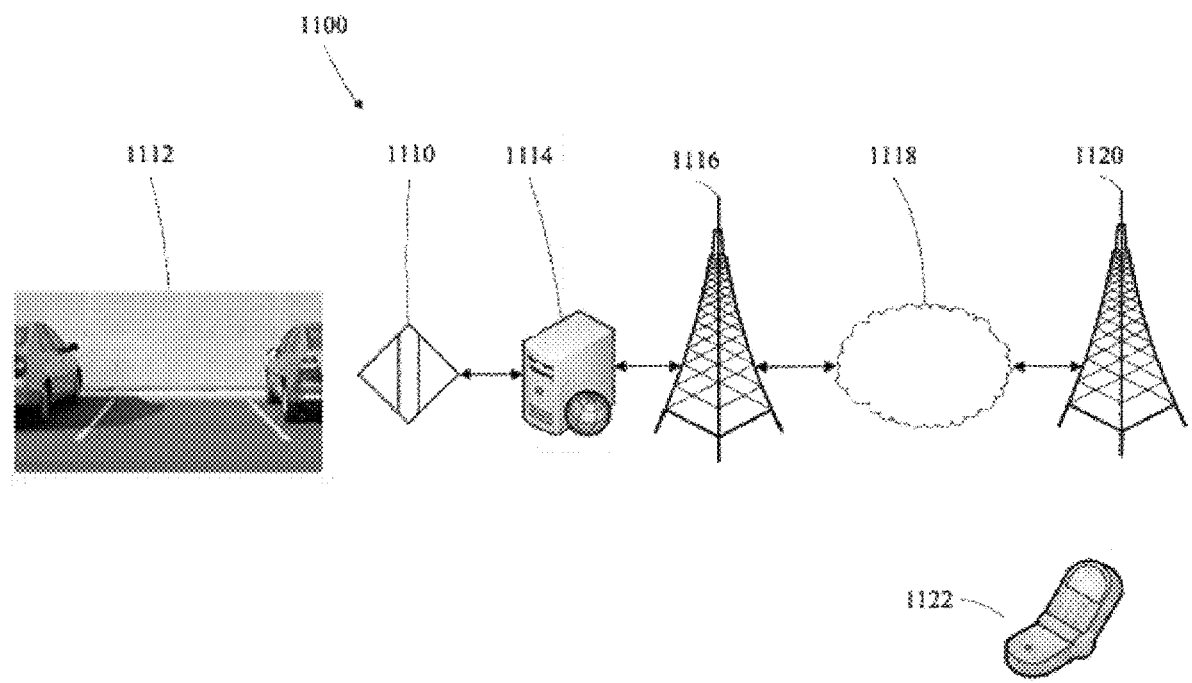
FIG. 11 illustrates a network diagram of a client device operating with a park assistance configuration by using an engine electromagnetic signal according to example embodiments.

FIG. 11 illustrates an engine electromagnetic detection configuration according to example embodiments. Referring to FIG. 11, the system 1100 provides for each time a spark plug is ignited, the spark plug ignites a small spark that is between 12,000 and 45,000 volts. This spark outputs an easily detectable RF signal. The approach and departure of these detected sparks may be different and permits a sensor to determine whether a vehicle is approaching or leaving a parking space. The system detects 1110 the change in the approach or departure of these spark plug sparks in a parking space 1112. The detected spark plug spark approach or departure is analyzed by a local processing system 1114 that analyzes the strength of the spark plug signal and determines whether the auto is approaching or leaving the parking space. The local processing unit 1114 is a mobile device transceiver 1116. This strength of spark plug EM signature indicates ingress/egress that is communicated as a change in presence to the local processing unit that contains a computer processor and memory. A cellular signal is communicated from the local processing unit to a cloud 1118 which takes the analysis and interprets the availability of a parking space which is sent by cellular communication 1120 to an interested user device such as a cell phone 1122. An interested user device is a device that has been registered to receive parking space information. The communication of this data to an interested user device is based on parking spaces in an area of interest identified by the interested user profile. Registering an area of interest includes specifying an address and/or a radius of interest distance from the specified address. The RF field strength follows the inverse square law, in this example we are measuring the change in field strength. Since it follows as an inverse square to the distance, approaching spark plug RFs will increase rapidly in field strength, while leaving sparks will decrease rapidly in field strength. It is the delta RF field strength with respect to time that is being relied upon for detection purposes.

In one example the radius of interest may be found using a GOOFLE MAPS API:

```
function codeAddress( ) {
    var address=document.getElementById('address').value;
    var radius=parseInt(document.getElementById('radius')
       .value, 10)*1000;
    geocoder.geocode({'address': address}, function(results,
       status) {
       if (status==google.maps.GeocoderStatus.OK) {
          map.setCenter(results[0].geometry.location);
          var marker=new google.maps.Marker({
             map: map,
             position: results[0].geometrylocation
          });
          if (circle) circle.setMap(null);
          circle=new google.maps.Circle({center:marker.get-
             Position( )
             radius: radius,
             fillOpacity: 0.35,
             fillColor: "#FF0000",
             map: map});
          var bounds=new google.maps.LatLngBounds( )
          for (var i=0; i<gmarkers.length;i++) {
          if    (google.maps.geometry.spherical.computeDis-
                tanceBetween(gmarkers[i].getPosition( ),marker-
                .get Position( )<radius) {
             bounds.extend(gmarkers[i].getPosition( )
             gmarkers[i].setMap(map);
          } else {
             gmarkers[i].setMap(null);
             }
          }
          map.fitBounds(bounds);
       } else {
       alert('Geocode was not successful for the following
          reason:'+status);
       }
    });
}.
```

Figure 12:
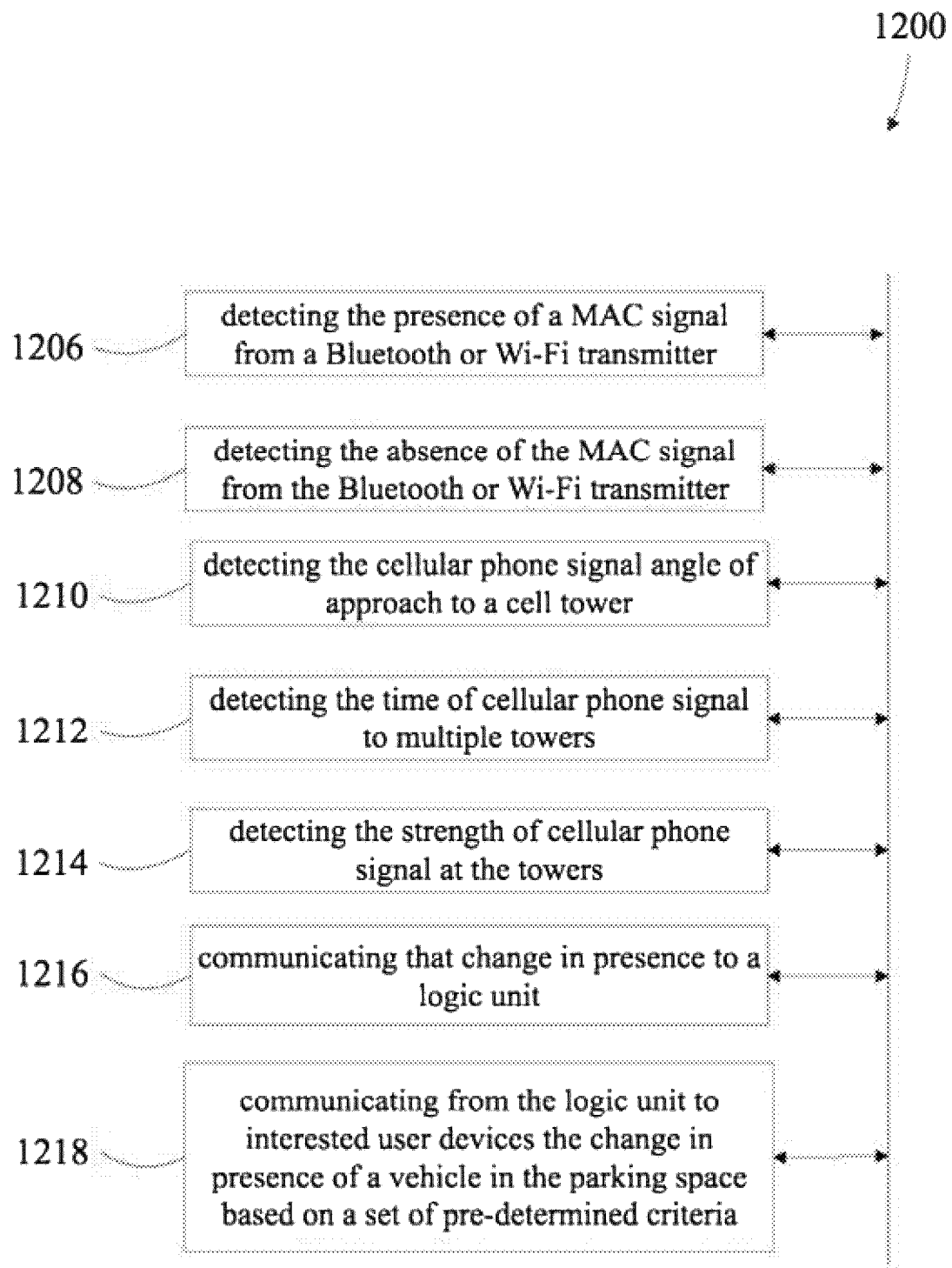
FIG. 12 illustrates a flow diagram of an example method of utilizing cellular signals to detect parking space availability according to example embodiments.

FIG. 12 illustrates a flow diagram of a cellular phone operation for monitoring parking availability. Referring to FIG. 12, the availability of a parking space may be identified based on a cell phone signal location example method 1200. The procedure includes detecting 1210 the cellular phone signal angle of approach to a cell tower, detecting 1212 the time of cellular phone signal to multiple different towers, detecting 1214 the strength of cellular phone signal at the towers, communicating 1216 that change in presence to a logic unit. The analysis of the signal angle, time of transit of the signal and power of the signal between cell towers allows a localization of the cellular phone. A cellular signal is communicated 1218 from the logic unit to an interested user device such as a cell phone. The communication of this data to an interested user is based on parking spaces in an area of interest identified by the interested user. The availability of a parking space may be identified based on a cell phone signal location example method 1200. The procedure may include 1206 detecting a MAC address of a nearby cell phone utilizing either Bluetooth or Wi-Fi. The MAC address may be observed in wireless signals even if a device is not actively connected to a particular wireless network. Whenever Wi-Fi or BLUETOOTH is turned on in a smartphone, the smartphone will transmit periodic signals that include the MAC address of the device to signal to other devices that the device is present. The procedure also includes detecting 1208 the absence of the MAC address from the BLUETOOTH or Wi-Fi signal indicating that a vehicle has left the immediate vicinity of the Wi-Fi and/or BLUETOOTH transceiver. The process also includes detecting 1210 the cellular phone signal angle of approach to a cell tower, detecting 1212 the time of cellular phone signal to multiple different towers, detecting 1214 the strength of cellular phone signal at the towers, communicating 1216 that change in presence to a logic unit. The analysis of the signal angle, time of transit of the signal and power of the signal between cell towers permits a localization of the cellular phone. A cellular signal is communicated 1218 from the logic unit to an interested user device such as a cell phone. The communication of this data to an interested user is based on parking spaces in an area of interest identified by the interested user.

Figure 13:
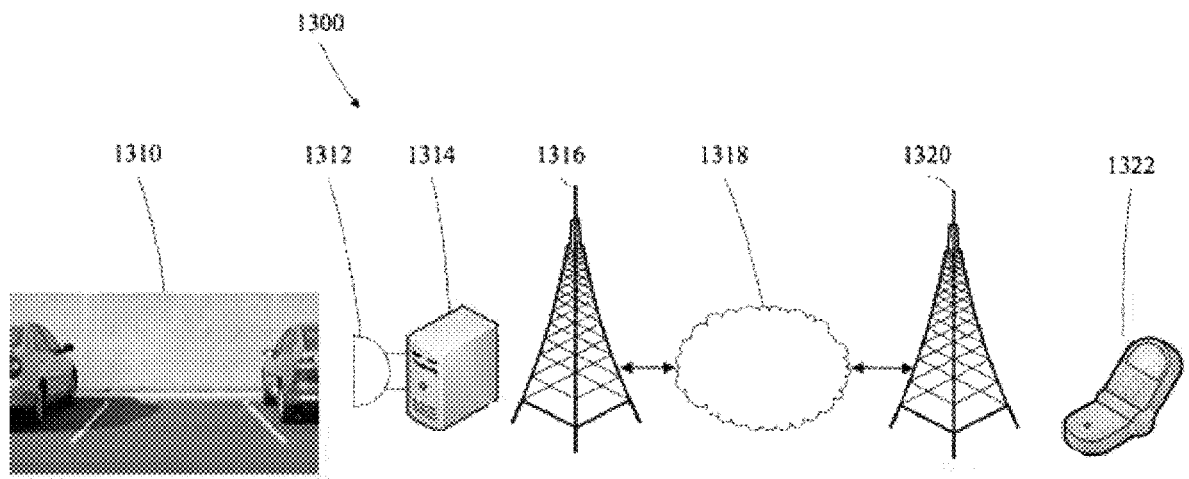
FIG. 13 illustrates a network diagram of a client device operating with a sonic signal park assistance configuration according to example embodiments.

FIG. 13 illustrates a sonic signal system configuration according to example embodiments. Referring to FIG. 13, the sonic signal system example 1300 can be used to update the availability of parking spaces. In the general sonic signal example, a microphone may measure the click of a transmission going into or out of park or an approaching or leaving engine sound which can be measured by a microphone 1312 connected to a logic unit 1314 to determine the presence of a vehicle. The analyzed sound signal is transmitted to a cell tower 1316 connected to a cloud computing platform 1318. The cloud server(s) sends status changes of the space 1310 to interested parties by a cellular transceiver 1320 to a user's device 1322, which in this example is a smartphone, the user's device may also be a personal computer, a laptop, a personal computing tablet, a PDA, a watch, glasses or any device with a processor and memory.

Figure 14:
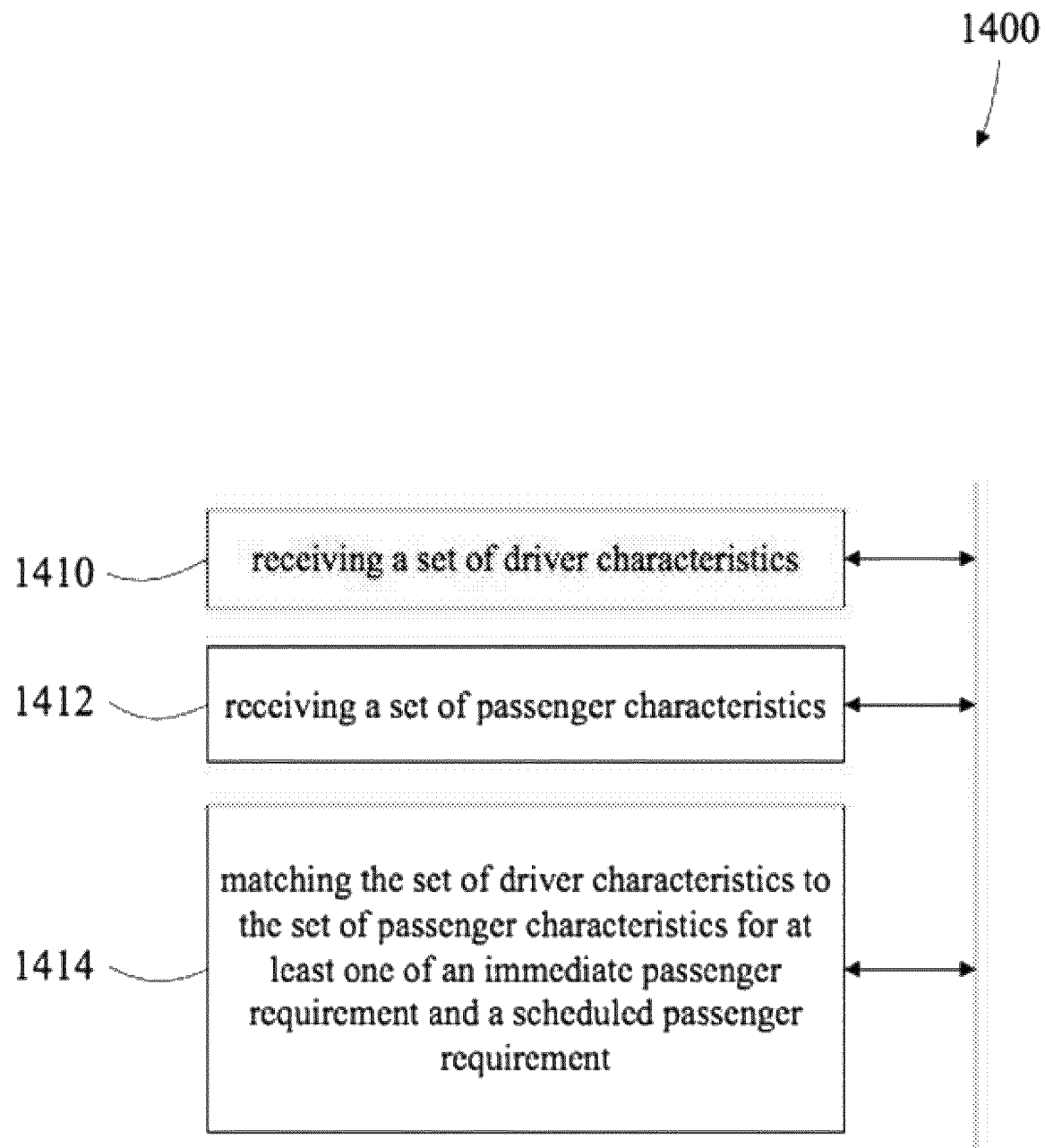
FIG. 14 illustrates a flow diagram of a tire sound method of parking space determination according to example embodiments.

FIG. 14 illustrates a parking space automotive tire sound example method 1400. The method includes detecting 1410 a change in the approach or departure of the sound of an automobile tire and communicating 1416 that detected change in presence to a logic unit. A cellular signal is communicated 1418 from the logic unit to an interested user device, such as a cell phone. The communication of this data to an interested user is based on parking spaces in an area of interest marked by the interested user.

Figure 15:
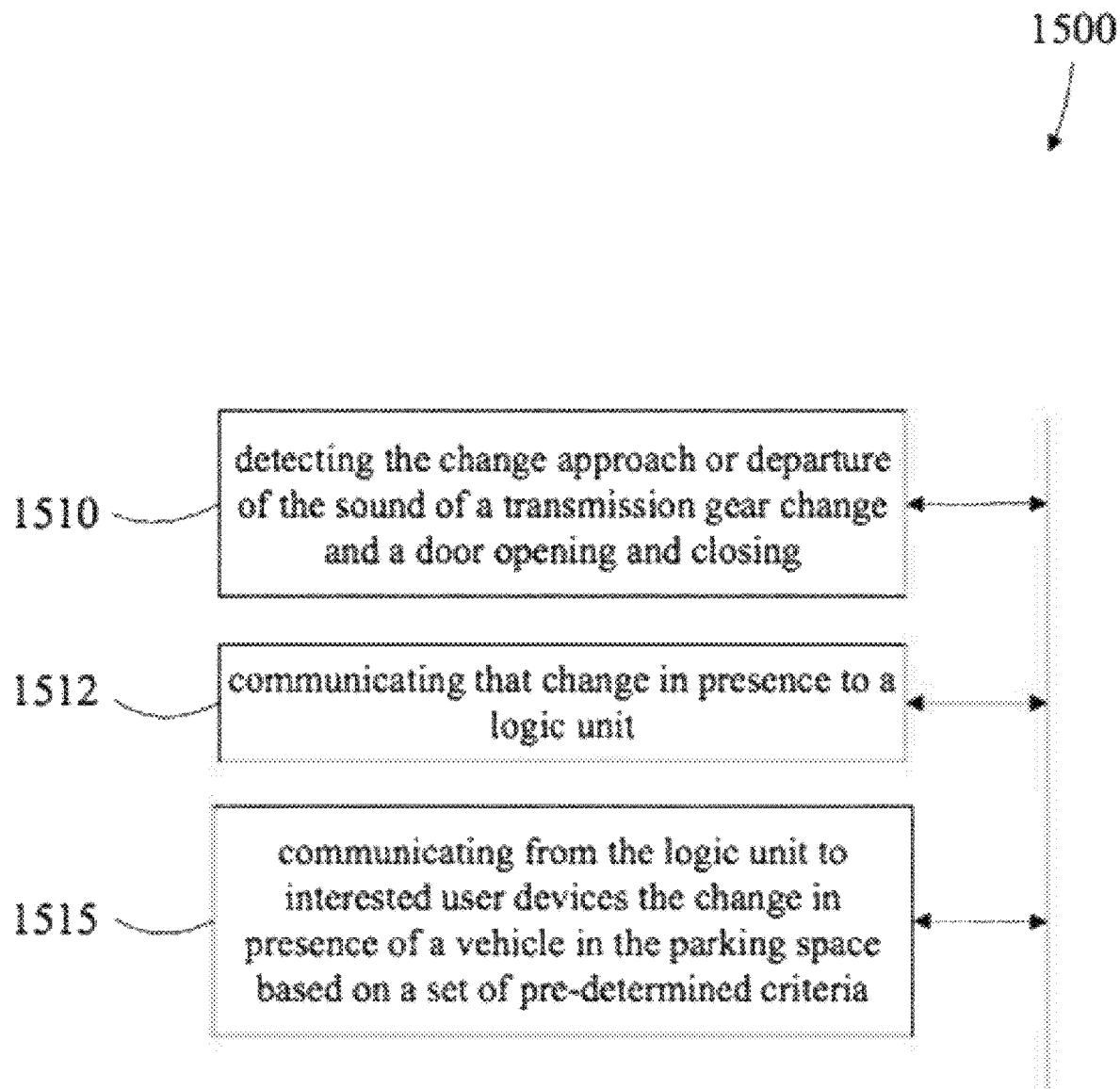
FIG. 15 illustrates a flow diagram of a transmission and door sound method of parking space determination according to example embodiments.

FIG. 15 illustrates a transmission and door sound signal example of presence detection according to example embodiments. Referring to FIG. 15, a parking space transmission gear sound example method 1500 is illustrated. In this example, as a car arrives at a parking space, a transmission "click" of gear changing may precede a door shutting or "thwap" sound. As a car leaves a parking space, the door "thwap" precedes the transmission click. In this sequence of the relative sounds, it is possible to determine whether a vehicle has approached or left a parking spot. For example, by having the transmission "click" first and the door "thwap" occur second then one series of sounds (first click then thwap) may be identified as a series that indicates a vehicle is arriving. The opposite series of sounds may indicate the reverse which may be a vehicle leaving a space.

The example method may include detecting 1510 the change in approach/departure of the sound of a transmission gear change and a door opening and closing and communicating 1512 that change in presence to a logic unit. A cellular signal or other communication signal may be communicated 1515 from the logic unit to an interested user device such as a cell phone. The communication of this data to an interested user is based on parking spaces in an area of interest marked out by the interested user.

An example noise detection API that sends an SMS text message over a cellular system may include:

```
#!/usr/bin/ruby -w

require 'getoptlong'
require 'optparse'
require 'net/smtp'
require 'logger'
require 'date'
HW_DETECTION_CMD = "cat /proc/asound/cards"
# You need to replace MICROPHONE with the name of your microphone, as reported
# by /proc/asound/cards
SAMPLE_DURATION = 5 # seconds
FORMAT = 'S16_LE' # this is the format that my USB microphone generates
THRESHOLD = 0.05
RECORD_FILENAME='/tmp/noise.wav'
LOG_FILE='var/log/noise_detector.log'
PID_FILE='etc/noised/noised.pid'
logger = Logger.new(LOG_FILE)
logger.level = Logger::DEBUG
logger.info("Noise detector started @ #{DateTime.now.strftime('%d/%m/%Y %H:%M:%S')}")
def self.check_required( )
        if !File.exists?('/usr/bin/arecord')
           warn "/usr/bin/arecord not found; install package alsa-utils"
      exit 1
end
if !File.exists?('/usr/bin/sox')
    warn "/usr/bin/sox not found; install package sox"
      exit 1
      end
if !File.exists?('/proc/asound/cards')
    warn "/proc/asound/cards not found"
    exit 1
      end
      end
      # Parsing script parameters
      options = { }
      optparse = OptionParser.new do |opts|
opts.banner ="Usage: noise_detection.rb -m ID [options]"
opts.on("-m", "--microphone SOUND_CARD_ID", "REQUIRED: Set microphone id") do |m|
      options[:microphone] = m
      end
```

```
      opts.on("-s", "--sample SECONDS", "Sample duration") do |s|
         options[:sample] = s
      end
      opts.on("-n", "--threshold NOISE_THRESHOLD", "Set Activation noise Threshold.
EX. 0.1") do |n|
         options[:threshold] = n
      end
      opts.on("-e", "--email DEST_EMAIL", "Alert destination email") do |e|
         options[:email] = e
      end
      opts.on("-v", "--[no-]verbose", "Run verbosely") do |v|
         options[:verbose] = v
      end
      opts.on("-d", "--detect", "Detect your sound cards ") do |d|
         options[:detection] = d
      end
      opts.on("-t", "--test SOUND_CARD_ID", "Test soundcard with the given id") do |t|
         options[:test] = t
      end
      opts.on("-k", "--kill", "Terminating background script") do |k|
         options[:kill] = k
      end
   end.parse!
   if options[:kill]
      logger.info("Terminating script");
      logger.debug("Looking for pid file in #{PID_FILE }")
      begin
         pidfile = File.open(PID_FILE, "r")
         storedpid = pidfile.read
         Process.kill("TERM", Integer(storedpid))
      rescue Exception => e
         logger.error("Cannot read pid file: " + e.message)
         exit 1
      end
      exit 0
   end
   if options[:detection]
      puts "Detecting your soundcard..."
      puts '#{HW_DETECTION_CMD }'
      exit 0
   end
          #Check required binaries
   check_required( )
   if options[:sample]
      SAMPLE_DURATION = options[:sample]
   end
   if options[:threshold]
      THRESHOLD = options[:threshold].to_f
   end
   if options[:test]
      puts "Testing soundcard..."
      puts '/usr/bin/arecord -D plughw: #{options[:test]},0 -d #{SAMPLE_DURATION } -f
#{FORMAT} 2>/dev/null | /usr/bin/sox -t .wav - -n stat 2>&1'
      exit 0
   end
   optparse.parse!
   #Now raise an exception if we have not found a host option
   raise OptionParser::MissingArgument if options[:microphone].nil ?
   raise OptionParser::MissingArgument if options[:email].nil ?
   if options[:verbose]
      logger.debug("Script parameters configurations:")
      logger.debug("SoundCard ID: #{options[:microphone]}")
      logger.debug("Sample Duration: #{SAMPLE_DURATION}")
      logger.debug("Output Format: #{FORMAT}")
      logger.debug("Noise Threshold: #{THRESHOLD}")
      logger.debug("Record filename (overwritten): #{RECORD_FILENAME}")
      logger.debug("Destination email: #{options[:email]}")
   end
   #Starting script part
   pid = fork do
      stop_process = false
      Signal.trap("USR1") do
         logger.debug("Running...")
      end
      Signal.trap("TERM") do
         logger.info("Terminating...")
         File.delete(PID_FILE)
         stop_process = true
      end
```

-continued

```
loop do
        if (stop_process)
                logger.info("Noise detector stopped @ #{DateTime. now.strftime('%d/%m/%Y %H:%M:%S')}")
                break
        end
        rec_out = '/usr/bin/arecord -D plughw:#{options[:microphone]},0 -d #{SAMPLE_DURATION} -f #{FORMAT}-t wav #{RECORD_FILENAME} 2>/dev/null'
        out = '/usr/bin/sox -t .wav #{RECORD_FILENAME} -n stat 2>&1'
        out.match(/Maximum amplitude:\s+(.*)/m)
        amplitude = $1.to_f
        logger.debug("Detected amplitude: #{amplitude}") if options[:verbose]
        if amplitude > THRESHOLD
          logger.info("Sound detected!!!")
              # Read a file
              filecontent = File.open(RECORD_FILENAME , "rb") {|io| io.read}
  encoded = [filecontent].pack("m") # base64 econding
        puts value = %x[/usr/sbin/sendmail #{options[:email]} << EOF
        subject: WARNING: Noise Detected
        from: home@mornati.net
        Content-Description: "noise.wav"
        Content-Type: audio/x-wav; name="noise.wav"
        Content-Transfer-Encoding:base64
        Content-Disposition: attachment; filename="noise.wav"
        #{encoded}
        EOF]
          else
              logger.debug("No sound detected...")
          end
        end
        end
        Process.detach(pid)
        logger.debug("Started... (#{pid})")
        File.open(PID_FILE, "w") { |file| file.write(pid) }
        import urllib
        def sendSMS(uname, pword, numbers, sender, message):
          params = {'uname':uname, 'pword':pword, 'selectednums':numbers, 'message':message, 'from':sender}
          return (f.read( ), f.code)
          Source:.
```

Figure 16:
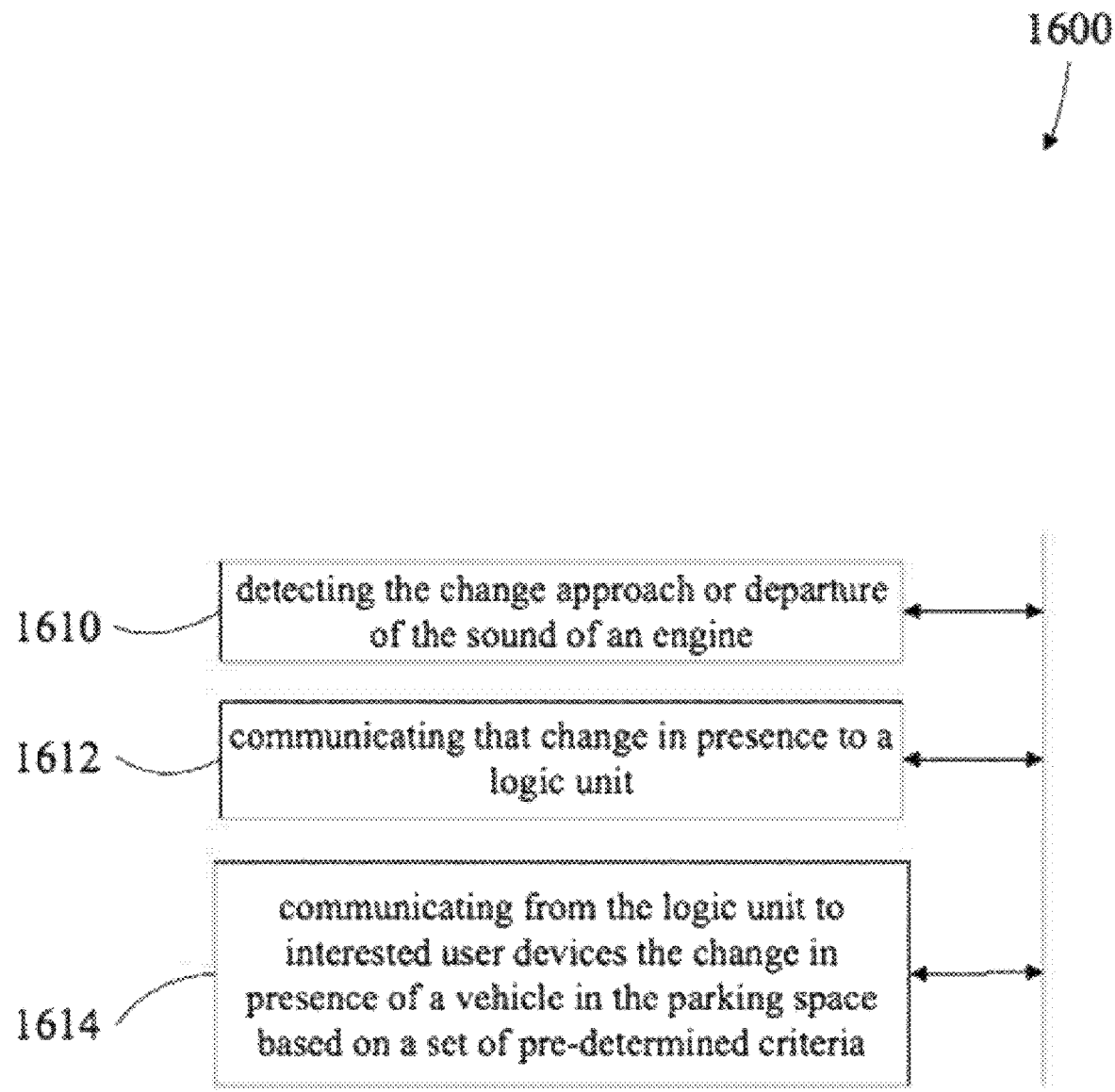
FIG. 16 illustrates a flow diagram of an engine sound method of parking space determination according to example embodiments.

FIG. 16 illustrates a flow diagram of an engine sound method of operation to identify a vehicle changing positions in a parking spot. In FIG. 16, the method 1600 includes detecting 1610 the change in approach or departure of the 'hum' sound of an engine and communicating 1612 that change in presence to a logic unit. The hum would increase in volume as it approaches a parking spot and then terminate. In the reverse example, upon departure from the vehicle, the hum would begin and then decrease in volume continuously. A cellular signal or other wireless communication signal is then communicated 1614 from the logic unit to an interested user device such as a cell phone. The communication of this data to an interested user is based on parking spaces in an area of interest identify by the interested user.

An example noise detection API that sends an SMS text message over a cellular system may be:

```
#!/usr/bin/ruby -w
require 'getoptlong'
require 'optparse'
require 'net/smtp'
require 'logger'
require 'date'
HW_DETECTION_CMD="cat/proc/asound/cards"
by /proc/asound/cards
SAMPLE_DURATION=5 #seconds
FORMAT='S16_LE' this is the format that my USB microphone generates
THRESHOLD=0.05
RECORD_FILENAME='/tmp/noise.wav'
LOG_FILE='/var/log/noise_detectorlog'
PID_FILE='/etc/noised/noised.pid'
logger=Logger.new(LOG_FILE)
logger.level=Logger::DEBUG
logger.info("Noise detector started @ #{DateTime.now.strftime("% d/% m/% Y % H:% M:% S')}")
def self.check_required( )
    if !File.exists?('/usr/bin/arecord')
      warn "/usr/bin/arecord not found; install package alsa-utils"
      exit 1
    end
if !File.exists?('/usr/bin/sox')
    warn "/usr/bin/sox not found; install package sox"
    exit 1
end
if !File.exists?('/proc/asound/cards')
    warn "/proc/asound/cards not found"
    exit 1
end
end
#Parsing script parameters
options={ }
optparse=OptionParser.new do |opts|
    opts.banner="Usage:   noise_detection.rb   -m   ID {options}"
    opts.on("-m", "--microphone   SOUND_CARD_ID", "REQUIRED: Set microphone id") do |m|
      options[:microphone]=m
    end
```

```
opts.on("-s", "--sample SECONDS", "Sample duration")
    do |s|
    options[:sample]=s
end
opts.on("-n", "--threshold NOISE_THRESHOLD", "Set
    Activation noise Threshold. EX. 0.1") do |n|
    options[:threshold]=n
end
opts.on("-e", "--email DEST_EMAIL", "Alert destina-
    tion email") do |e|
    options[:email]=e
end
opts.on("-v", "--[no-]verbose", "Run verbosely") do |v|
    options[:verbose]=v
end
opts.on("-d", "--detect", "Detect your sound cards") do
    |d|
    options[:detection]=d
end
opts.on("-t", "--test SOUND_CARD_ID", "Test sound-
    card with the given id") do |t|
    options[:test]=t
end
opts.on("-k", "--kill", "Terminating background script")
    do |k|
    options[:kill]=k
end
end.parse!
if options[:kill]
    logger.info("Terminating script");
    logger.debug("Looking for pid file in #{PID_FILE}")
    begin
        pidfile=File.open(PID_FILE, "r")
        storedpid=pidfile.read
        Process.kill("TERM", Integer(storedpid))
    rescue Exception=>e
        logger.error("Cannot read pid file:"+e.message)
        exit 1
    end
    exit 0
end
if options[:detection]
    puts "Detecting your soundcard . . . "
    puts '#{HW_DETECTION_CMD}'
    exit 0
end
#Check required binaries
check_required( )
if options[: sample]
    SAMPLE_DURATION=options[: sample]
end
if options[:threshold]
    THRESHOLD=options[:threshold].to_f
end
if options[:test]
    puts "Testing soundcard . . . "
    puts '/usr/bin/arecord -D plughw:#{options:[:test]},0 -d
        #{SAMPLE_DURATION} -f
#{FORMAT} 2>/dev/null |/usr/bin/sox -t .wav - -n stat
2>&1'
    exit 0
end
optparse.parse!
#Now raise an exception if we have not found a host option
raise OptionParser::MissingArgument if options[:micro-
    phone].nil?
raise OptionParser::MissingArgument if options[:email]
    .nil?
if options[:verbose]
    logger.debug("Script parameters configurations:")
    logger.debug("SoundCard       ID:       #{options[:micro-
        phone]}")
    logger.debug("Sample Duration: #{SAMPLE_DURA-
        TION}")
    logger.debug("Output Format: #{FORMAT}")
    logger.debug("Noise Threshold: #{THRESHOLD}")
    logger.debug("Record     filename     (overwritten):
        #{RECORD_FILENAME}")
    logger.debug("Destination email: #{options[:email]}")
end
#Starting script part
pid=fork do
    stop_process=false
    Signal.trap("USR1") do
        logger.debug("Running . . . ")
    end
    Signal.trap("TERM") do
        logger.info("Terminating . . . ")
        File.delete(PID_FILE)
        stop_process=true
    end
    loop do
        if (stop_process)
            logger.info("Noise detector stopped @ #{DateTime-
                .now.strftime('% d/% m/% Y % H:% M:% S')}")
            break
        end
        rec_out='/usr/bin/arecord -D plughw:#{options[:micro-
            phone] },0 -d
#{SAMPLE_DURATION}-f     #{FORMAT}-t    way
#{RECORD_FILENAME} 2>/dev/null'
        out='/usr/bin/sox -t .wav #{RECORD_FILENAME}-n
            stat 2>&1'
        out.match(/Maximum amplitude: \s-F(*)/m)
        amplitude=$1.to_f
        logger.debug("Detected amplitude: #{amplitude}") if
            options[:verbose]
        if amplitude>THRESHOLD
            logger.info("Sound detected!!!")
            #Read a file
            filecontent=File.open(RECORD_FILENAME,"rb")
                {|io| io.read}
            encoded=[filecontent].pack("m") #base64 econding
puts        value=%       x[/usr/sbin/sendmail        #{options
[:email] }<<EOF
subject: WARNING: Noise Detected
from: home @mornati.net
Content-Description: "noise.wav"
Content-Type: audio/x-wav; name="noise.wav"
Content-Transfer-Encoding:base64
Content-Disposition: attachment; filename="noise.wav"
#{encoded}
EOF]
        else
            logger.debug("No sound detected . . . ")
        end
    end
end
Process.detach(pid)
logger.debug("Started . . . (#{pid})")
File.open(PID_FILE, "w") {|file| file.write(pid)}
import urllib
```

```
def sendSMS(uname, pword, numbers, sender, message):
  params={'uname':uname, 'pword':pword, 'selectednums':
  numbers, 'message':message,
  'from': sender}
  f=urllib.urlopen('https://www.textlocal.co.uk/sendsms-
  post.php?'+urllib.urlencode(params))
  return (f.read( ), f.code).
```

Figure 17:
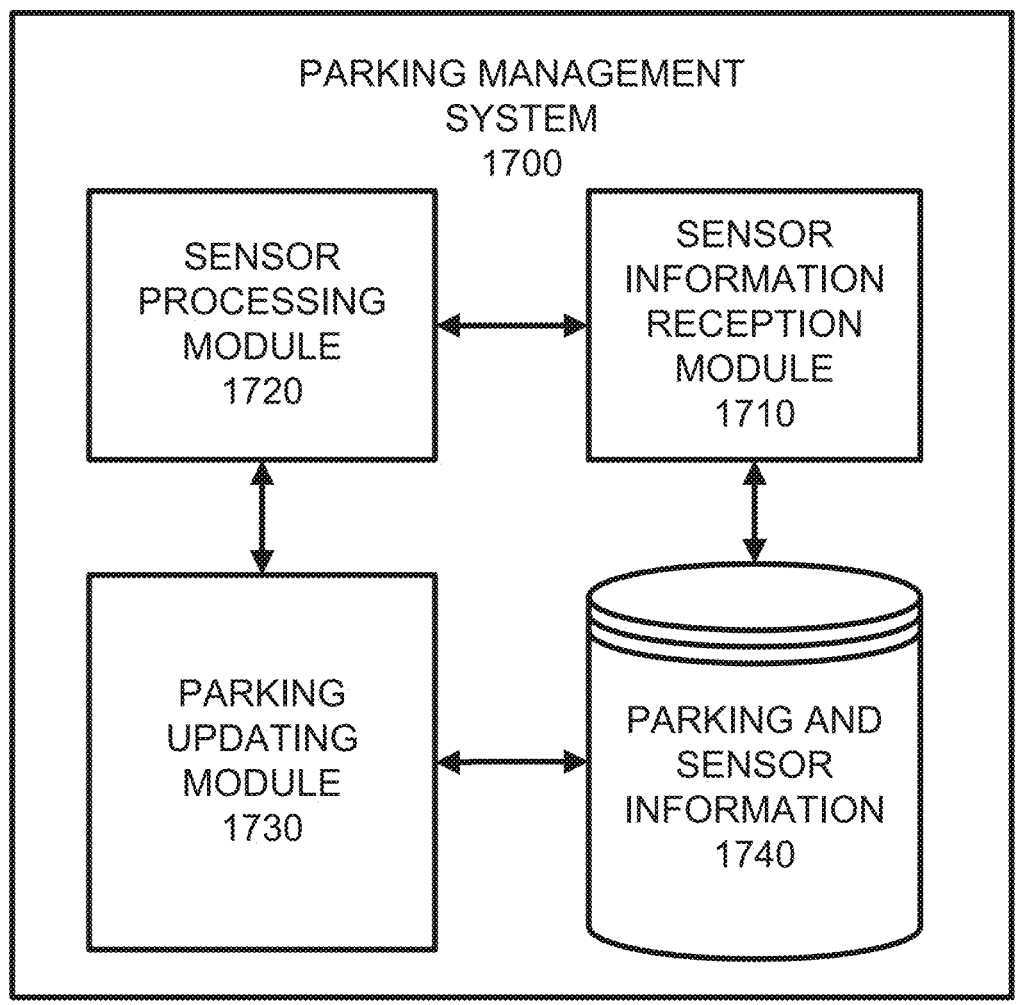
FIG. 17 illustrates a system configuration configured to perform one or more of the example embodiments of the present application.

FIG. 17 illustrates a system configuration 1700 of a computer, server or set of computing devices. The system may be used to identify parking space availability based on received input data. One example method of operation may include monitoring a predefined area via at least one sensor. Sensor information can be detected and received via the sensor information reception module 1710 including at least one change via the sensor. The sensor processing module 1720 may include a computing unit or device that compares the sensor data to a predefined condition stored in memory. The procedure also includes determining whether the changes identified satisfy the predefined condition, and a changed parking space status via the update module 1730. All information received and used to process such determinations may be stored in the sensor information database 1740.

The predefined area may be at least one parking space. The sensor could be a noise sensor and a camera among other sensor types. The at least one change may be multiple required changes or a sequence of changes caused over a predefined period of time and requiring different input from different sensors. The sequence of changes may include at least one of a series of sounds and a series of image content which occur in a predefined order. Once the data is received, a cellular communication signal indicating the at least one change may be transmitted from a sensor processing unit linked to the sensor to a receiver at a remote location. Also, the procedure may include determining the changed parking space status includes an available parking space, determining the predefined area is within at least one registered user's area of interest, and transmitting a notification to a registered user device of the changed status, and launching a map application on the registered user device displaying the available parking space.

In another example, a method may include activating a sensor to detect at least one status change, monitoring a predefined area for the at least one status change, receiving at least one status change at a first time, receiving at least one additional status change at a second time, and comparing the at least one status change and the at least one additional status change to a valid sequence of status changes to determine a valid sequence of status changes has occurred, and transmitting a notification to a registered user device previously registered to receive a notification when the valid sequence of status changes occurs. The sensor could be a video camera, a noise sensor, an electromagnetic sensor, a metal detector, a motion sensor, a cellular device sensor, and a radio frequency sensor. The notification may include an indication that at least one parking space is available or unavailable. The method may also include transmitting a cellular communication signal indicating the valid sequence of status changes to a receiver at a remote location. The valid sequence of status changes could include at least one of a plurality of noise changes within a predefined period of time and a plurality of image changes within a predefined period of time. The plurality of noise changes include at least two of an engine noise, a door opening or shutting noise, a tire friction noise, and a transmission gear noise. The valid sequence of status changes further comprises at least one of an electromagnetic sensed condition in combination with the at least one of the plurality of noise changes within the predefined period of time and the plurality of image changes within the predefined period of time.

The operations of a method or algorithm described in connection with the embodiments disclosed herein may be embodied directly in hardware, in a computer program executed by a processor, or in a combination of the two. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example, FIG. 18 illustrates an example network element 1800, which may represent any of the above-described network components, etc.

Figure 18:
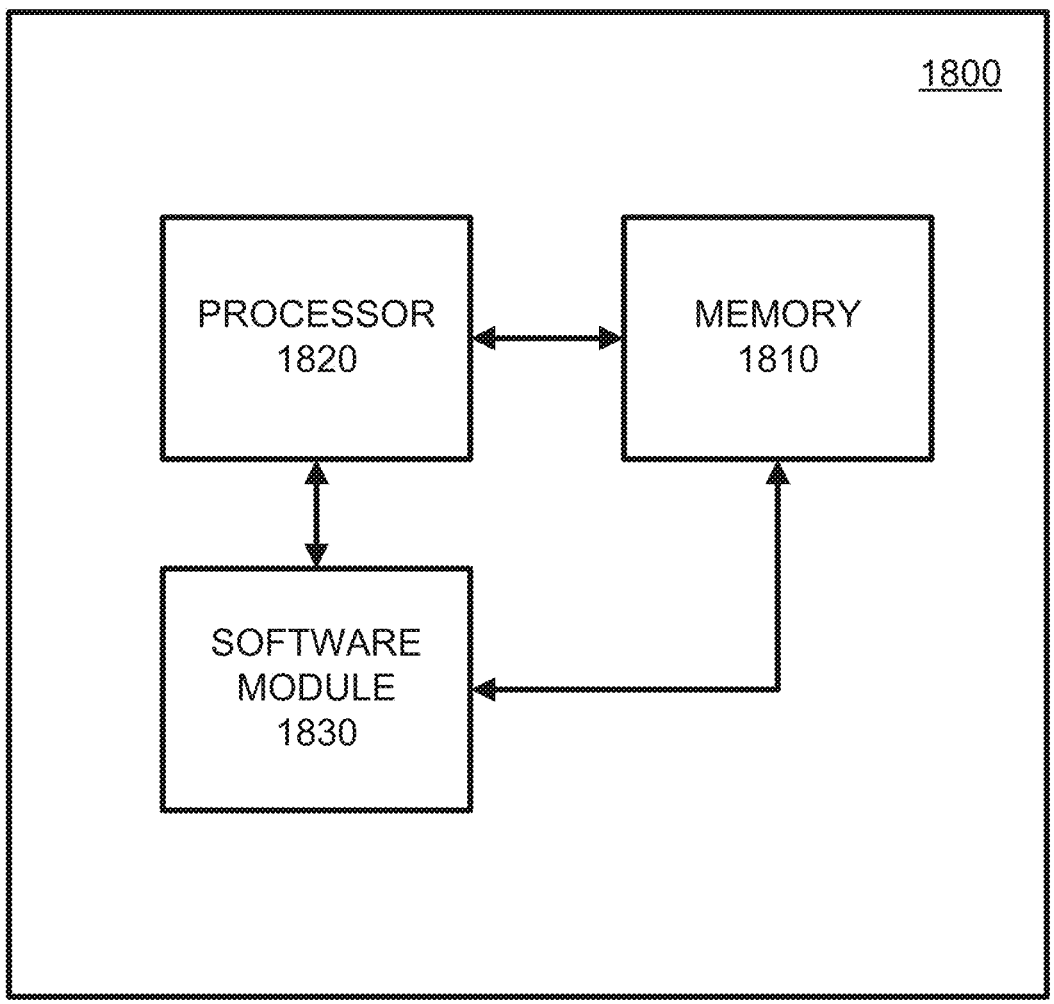
FIG. 18 illustrates an example network entity device configured to store instructions, software, and corresponding hardware for executing the same, according to example embodiments of the present application.

As illustrated in FIG. 18, a memory 1810 and a processor 1820 may be discrete components of the network entity 1800 that are used to execute an application or set of operations. The application may be coded in software in a computer language understood by the processor 1820, and stored in a computer readable medium, such as, the memory 1810. The computer readable medium may be a non-transitory computer readable medium that includes tangible hardware components in addition to software stored in memory. Furthermore, a software module 1830 may be another discrete entity that is part of the network entity 1800, and which contains software instructions that may be executed by the processor 1820. In addition to the above noted components of the network entity 1800, the network entity 1800 may also have a transmitter and receiver pair configured to receive and transmit communication signals (not shown).

Although an exemplary embodiment of the system, method, and computer readable medium of the present application has been illustrated in the accompanied drawings and described in the foregoing detailed description, it will be understood that the application is not limited to the embodiments disclosed, but is capable of numerous rearrangements, modifications, and substitutions without departing from the spirit or scope of the application as set forth and defined by the following claims. For example, the capabilities of the system of FIG. 15 can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way, but is intended to provide one example of many embodiments of the present application. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed, but is merely representative of selected embodiments of the application.

One having ordinary skill in the art will readily understand that the application as discussed above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent, while remaining within the spirit and scope of the application. In order to determine the metes and bounds of the application, therefore, reference should be made to the appended claims.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A method, comprising:
    receiving, by a first sensor associated with a parking space, a first input of a first type associated with a transport at a first time;
    receiving, by a second sensor associated with the parking space, a second input associated with the transport at a second time, where the second input is of a second type that is different than the first type;
    identifying a sequence of occurrence of the first input and the second input;
    comparing the sequence of occurrence to a predefined set of conditions stored in memory to identify a change in a status of the parking space with respect to the transport; and
    transmitting a notification to a user device indicating the change in status of the parking space.

2. The method of claim 1, wherein the first sensor and the second sensor are each at least one of:
    a video camera, a noise sensor type, an electromagnetic sensor type, a metal detector sensor type, a motion sensor type, a cellular device sensor type, and a radio frequency sensor type.

3. The method of claim 1, wherein the notification comprises:
    an indication that at least one parking space is available or unavailable.

4. The method of claim 1, further comprising:
    transmitting a cellular communication signal indicating the change in status to a receiver at a remote location.

5. The method of claim 1, wherein the identifying the sequence of occurrence of the first input and the second input comprises identifying at least one of:
    a plurality of ordered noise changes associated with the transport that occur within a predefined period of time, and
    a plurality of ordered image changes associated with the transport that occur within a predefined period of time.

6. The method of claim 5, wherein the plurality of ordered noise changes comprise at least two of:
    an engine noise, a door opening or shutting noise, a tire friction noise, and a transmission gear noise.

7. The method of claim 5, wherein the identifying the sequence of occurrence of the first input and the second input further comprises:
    identifying an electromagnetic condition in combination with the at least one of the plurality of noise changes and the plurality of image changes.

8. An apparatus, comprising:
    a processor configured to:
        receive, from a first sensor first sensor associated with a parking space, a first input of a first type associated with a transport at a first time;
        receive, from a second sensor associated with the parking space, a second input associated with the transport at a second time, where the second input is of a second type that is different than the first type;

identify a sequence of occurrence of the first input and the second input;

compare the sequence of occurrence to a predefined set of conditions stored in memory to identify a change in a status of the parking space with respect to the transport; and cause a transmitter configured to transmit a notification to a user device indicating the change in status of the parking space.

9. The apparatus of claim 8,
wherein the first sensor and the second sensor are each at least one of:
a video camera, a noise sensor type, an electromagnetic sensor type, a metal detector sensor type, a motion sensor type, a cellular device sensor type, and a radio frequency sensor type.

10. The apparatus of claim 8, wherein the notification comprises:
an indication that at least one parking space is available or unavailable.

11. The apparatus of claim 8, wherein the processor is further configured to cause the transmitter to:
transmit a cellular communication signal indicating the change in status to a receiver at a remote location.

12. The apparatus of claim 8, wherein, when the processor is to identify the sequence of occurrence of the first input and the second input, the processor further is to identify at least one of:
a plurality of ordered noise changes associated with the transport that occur within a predefined period of time, and
a plurality of ordered image changes associated with the transport that occur within a predefined period of time.

13. The apparatus of claim 12, wherein the plurality of ordered noise changes comprise at least two of:
an engine noise, a door opening or shutting noise, a tire friction noise, and a transmission gear noise.

14. The apparatus of claim 12, wherein, when the processor is to identify the sequence of occurrence of the first input and the second input, the processor further is to:
identify an electromagnetic condition in combination with the at least one of the plurality of noise changes and the plurality of image changes.

15. A non-transitory computer readable storage medium configured to one or more store instructions that when executed by a processor causes the processor to perform:
receiving, by a first sensor associated with a parking space, a first input of a first type associated with a transport at a first time;
receiving, by a second sensor associated with the parking space, a second input associated with the transport at a second time, where the second input is of a second type that is different than the first type;
identifying a sequence of occurrence of the first input and the second input;
comparing the sequence of occurrence to a predefined set of conditions stored in memory to identify a change in a status of the parking space with respect to the transport; and
transmitting a notification to a user device indicating the change in status of the parking space.

16. The non-transitory computer readable storage medium of claim 15, wherein the first sensor and the second sensor are each at least one of:
a video camera, a noise sensor type, an electromagnetic sensor type, a metal detector sensor type, a motion sensor type, a cellular device sensor type, and a radio frequency sensor type.

17. The non-transitory computer readable storage medium of claim 15, wherein the notification comprises:
an indication that at least one parking space is available or unavailable.

18. The non-transitory computer readable storage medium of claim 15, wherein the one or more store instructions are further to cause the processor to perform:
causing a transmission of transmitting a cellular communication signal indicating the change in status to a receiver at a remote location.

19. The non-transitory computer readable storage medium of claim 15, wherein the identifying the sequence of occurrence of the first input and the second input comprises identifying at least one of:
a plurality of ordered noise changes associated with the transport that occur within a predefined period of time, and
a plurality of ordered image changes associated with the transport that occur within a predefined period of time, and
wherein the plurality of ordered noise changes comprise at least two of:
an engine noise, a door opening or shutting noise, a tire friction noise, and a transmission gear noise.

20. The non-transitory computer readable storage medium of claim 19, wherein the identifying the sequence of occurrence of the first input and the second input further comprises:
identifying an electromagnetic condition in combination with the at least one of the plurality of noise changes and the plurality of image changes.

* * * * *